April 25, 1967   A. J. MAZZIO ET AL   3,315,957
COLLATOR FOR DUPLICATING MACHINES
Filed March 24, 1965   12 Sheets-Sheet 3

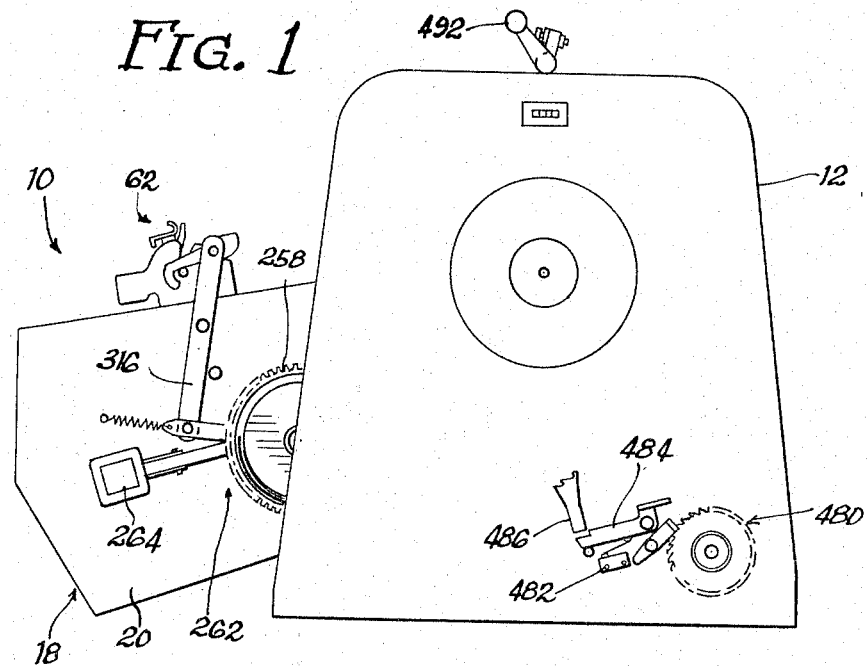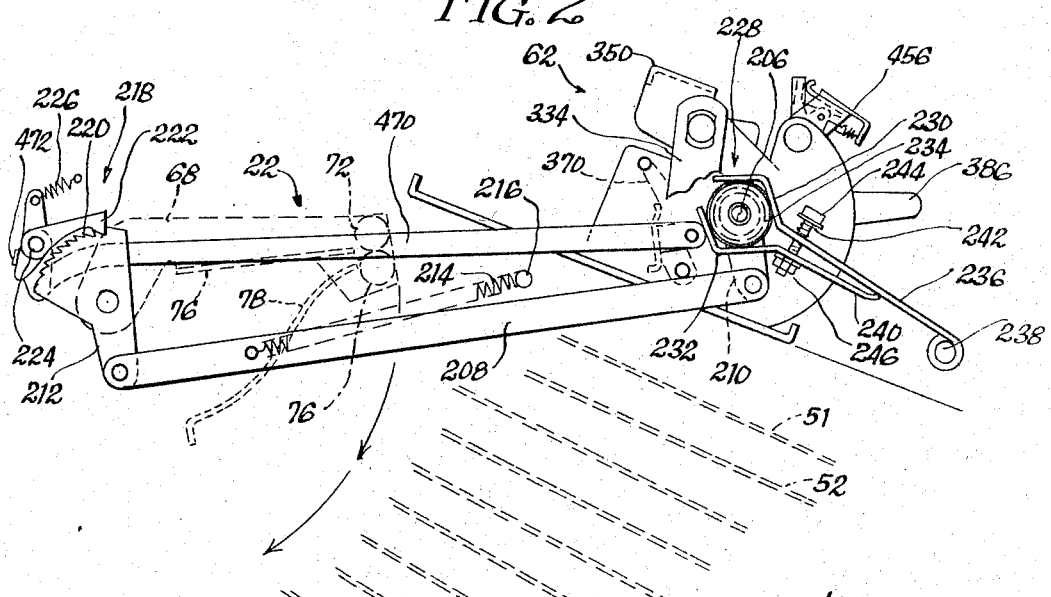

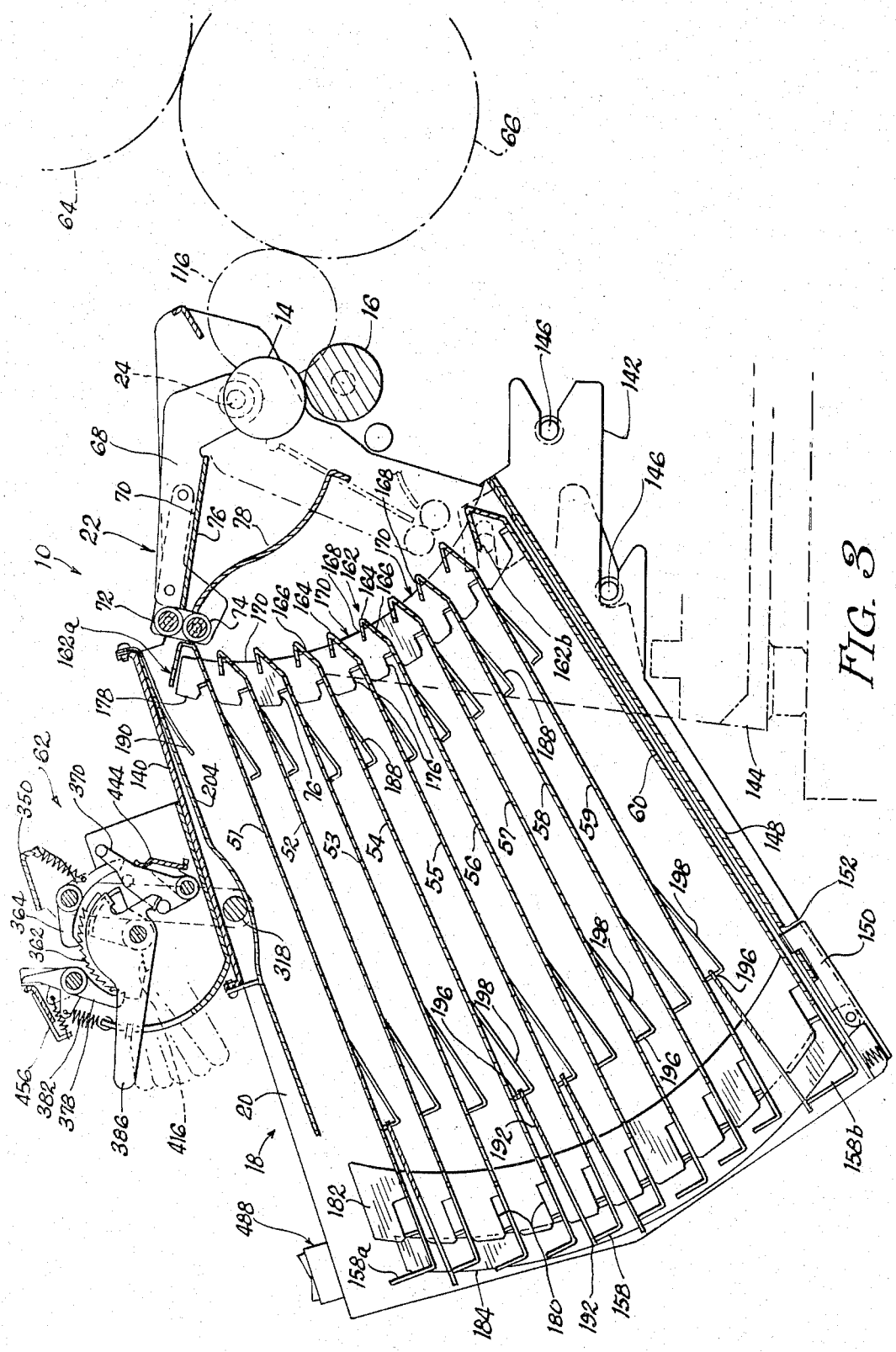

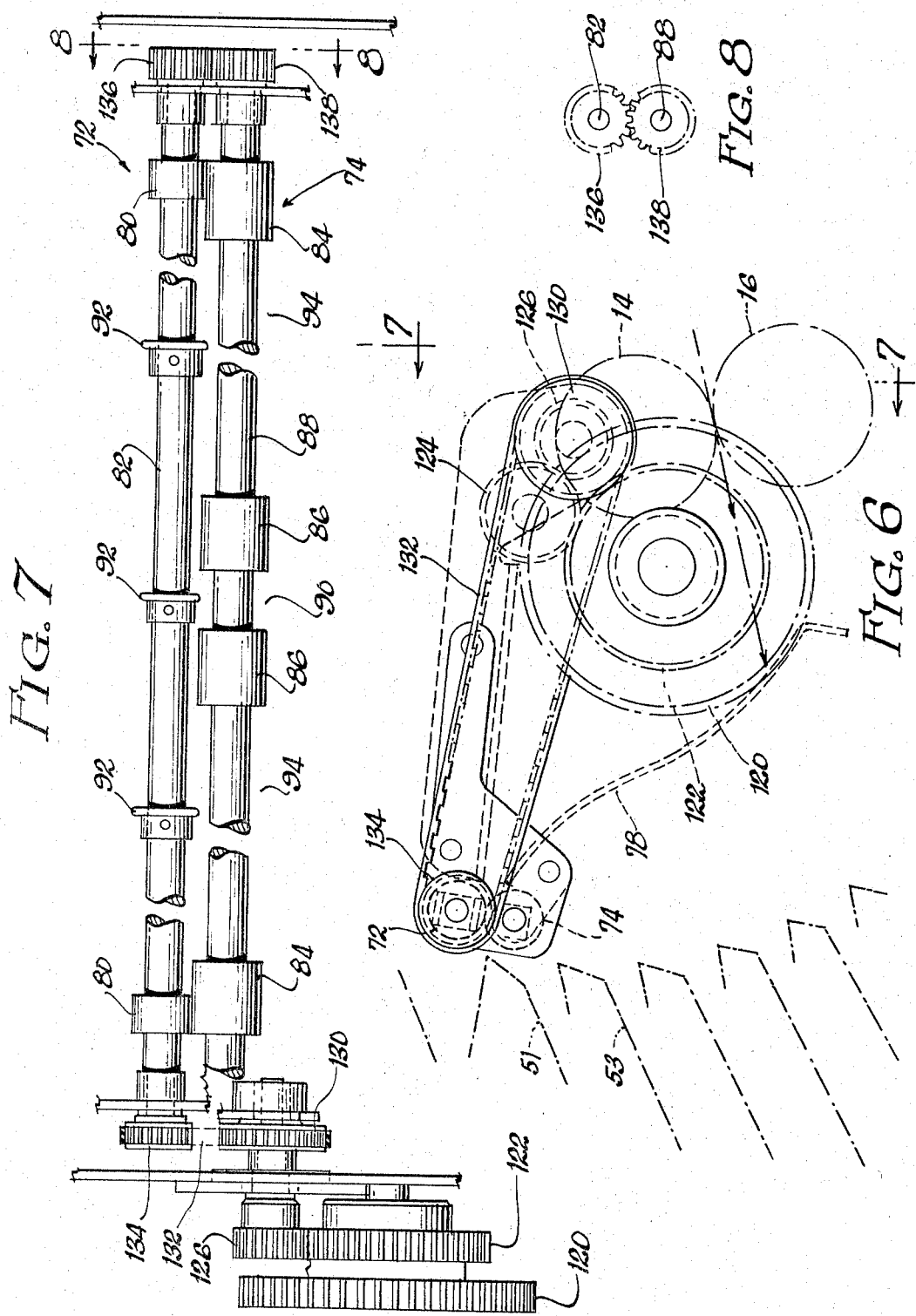

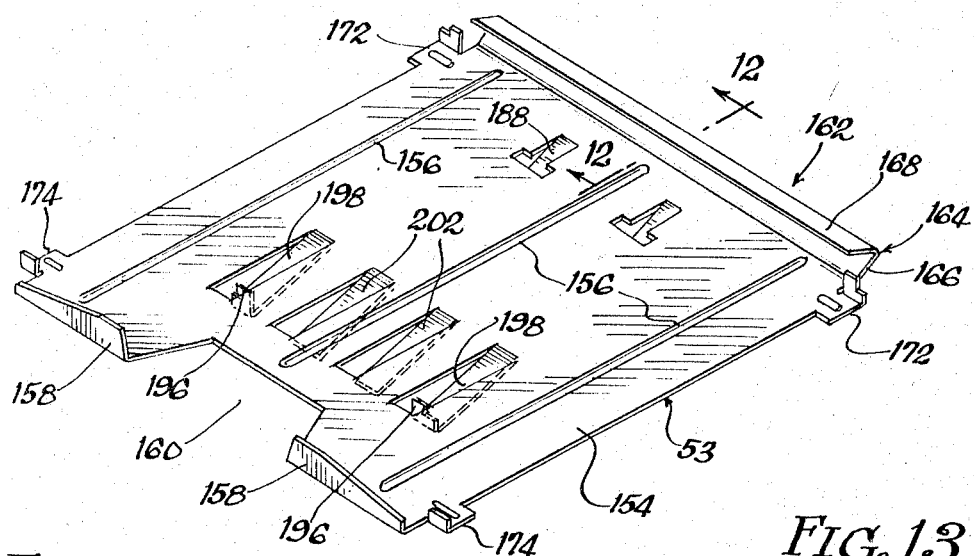
FIG. 9
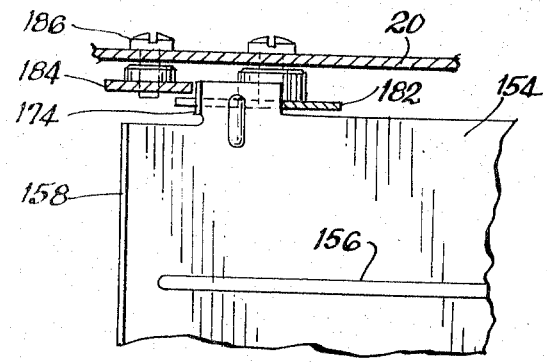
FIG. 11
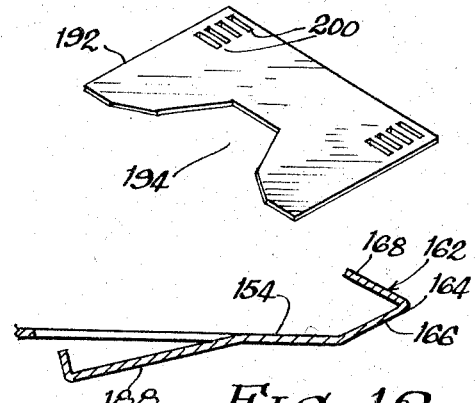
FIG. 13
FIG. 12
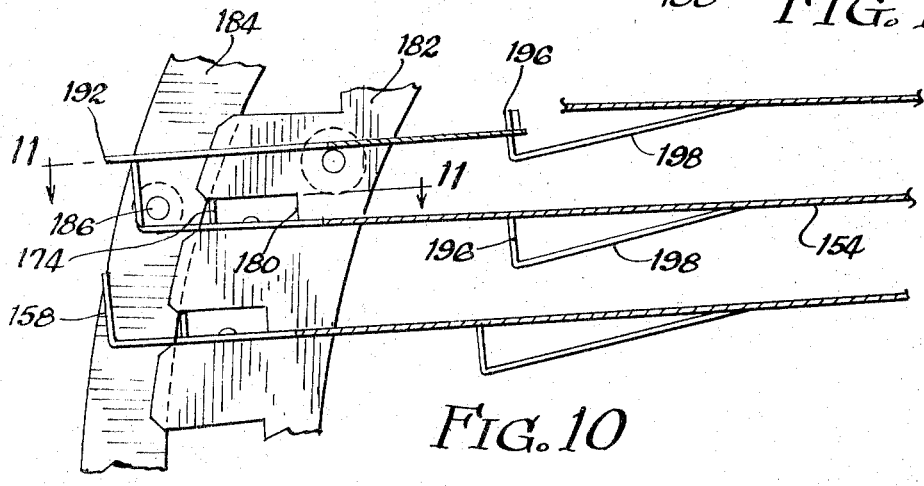
FIG. 10

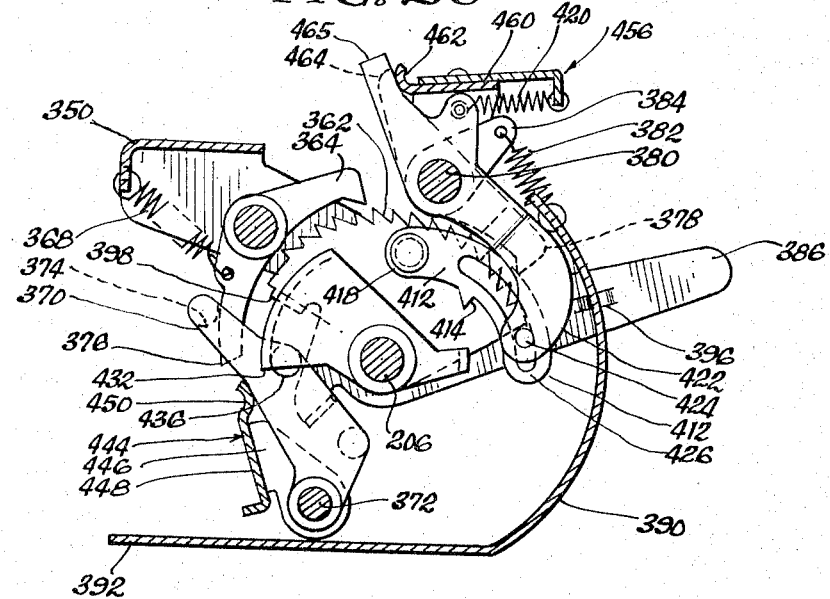
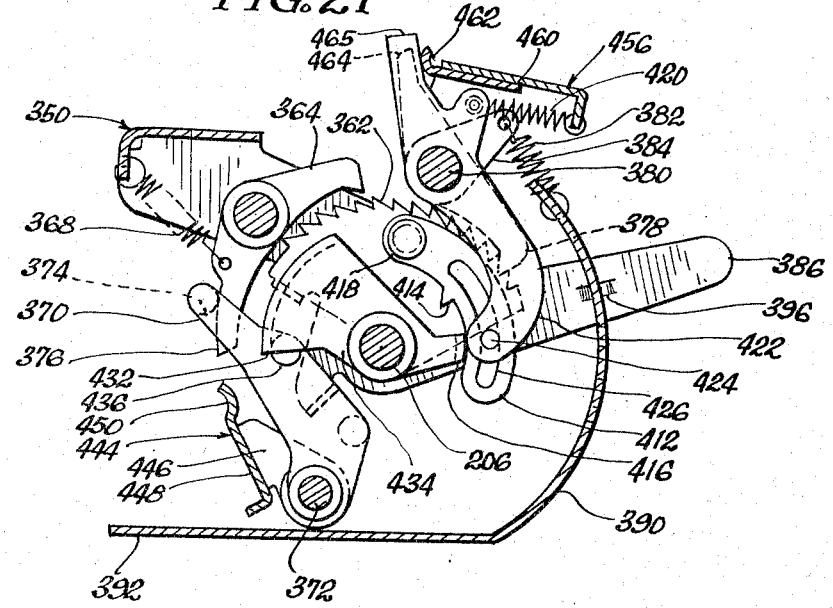

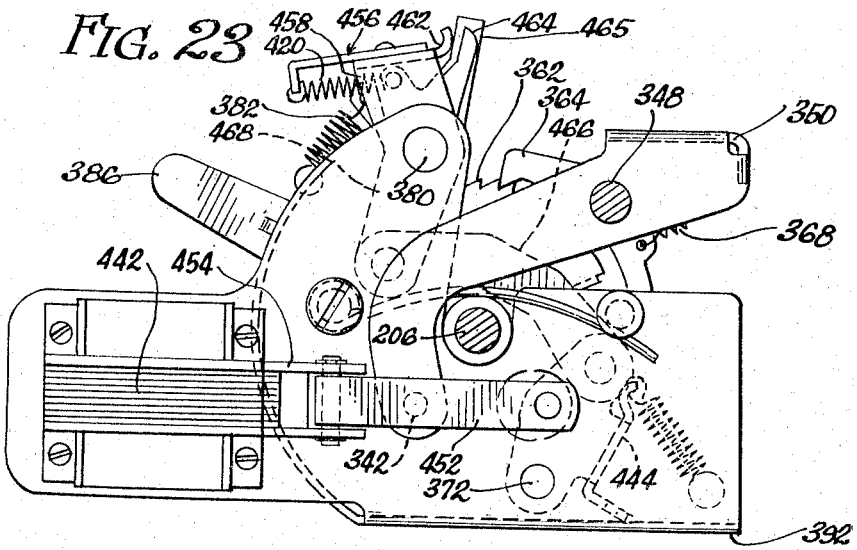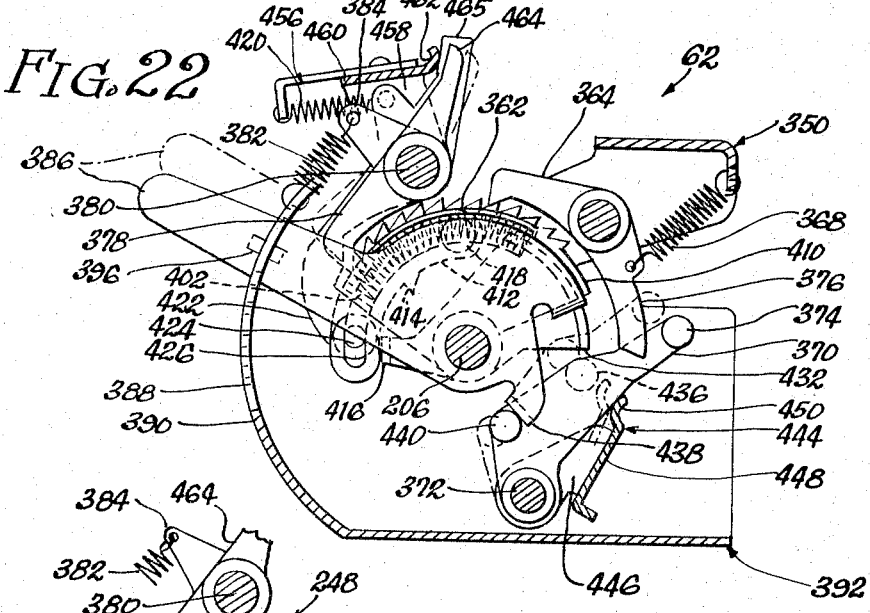

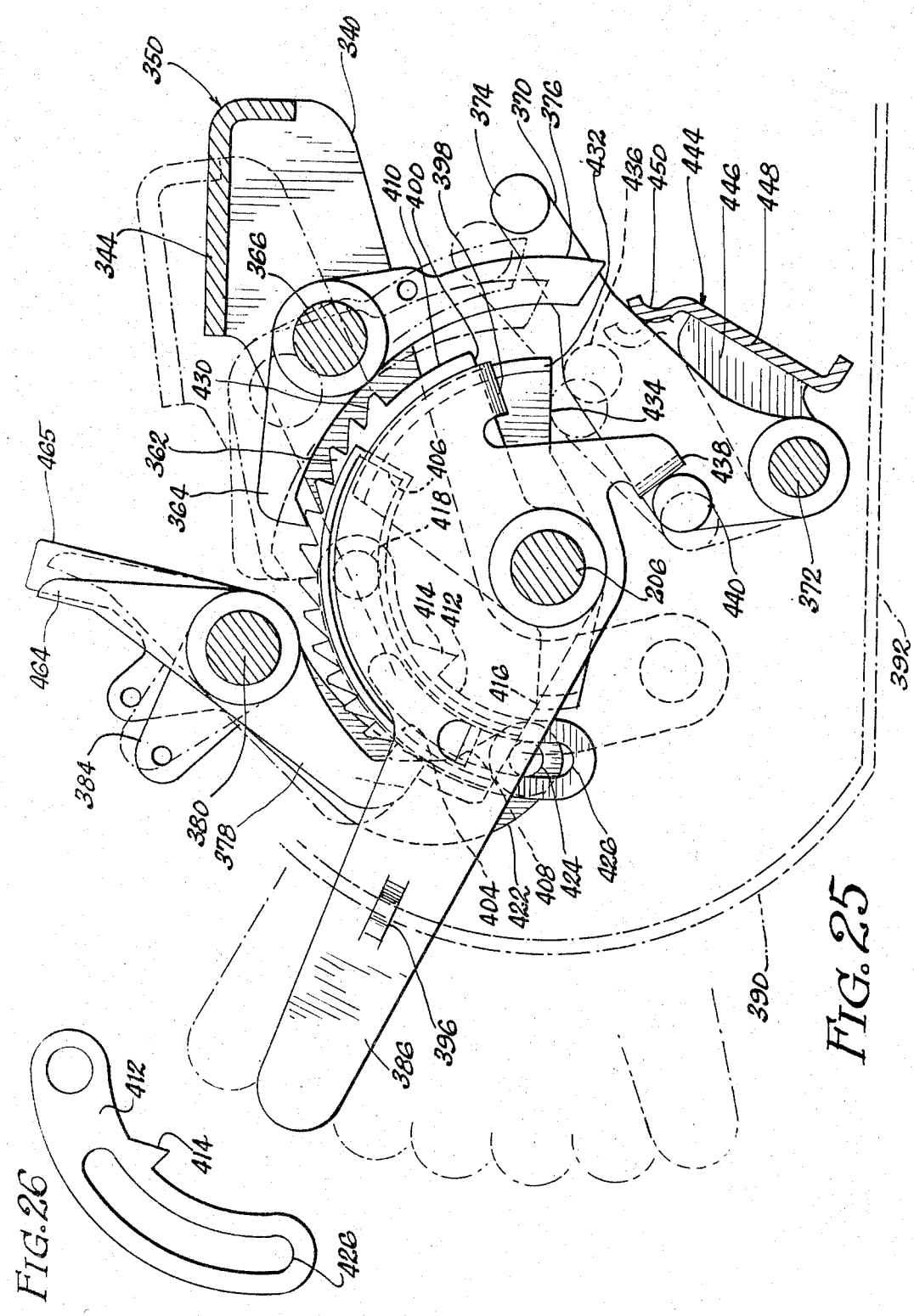

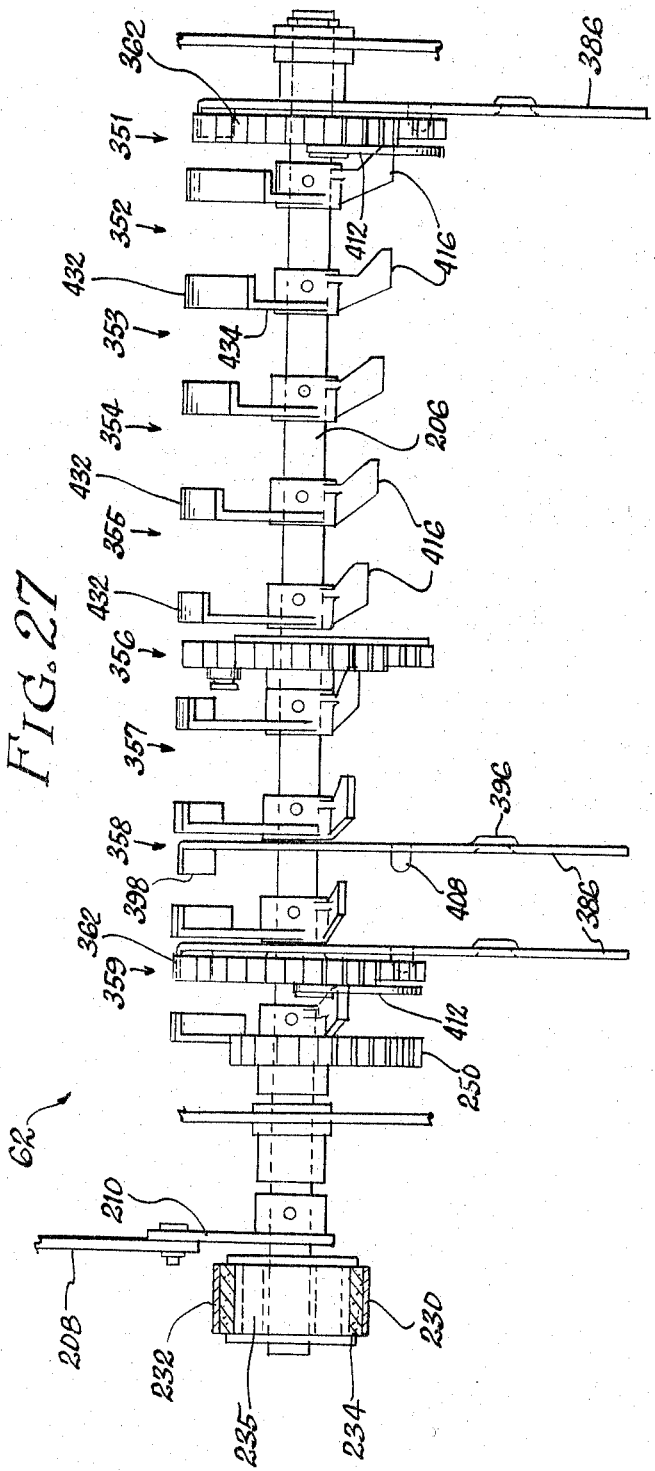
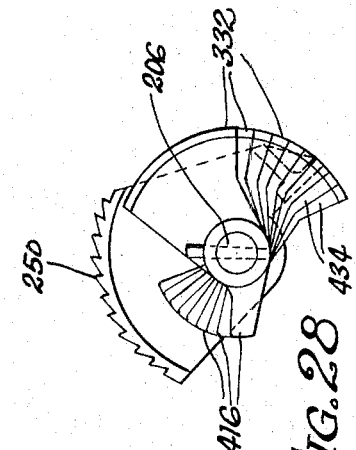
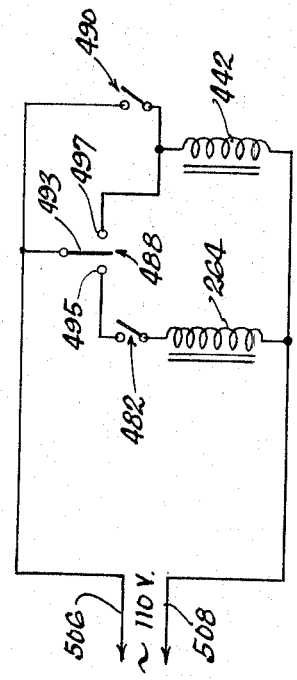

United States Patent Office 3,315,957
Patented Apr. 25, 1967

3,315,957
COLLATOR FOR DUPLICATING MACHINES
Anthony James Mazzio, Chicago, and Wallace Richard Fowlie, North Riverside, Ill., assignors to A. B. Dick Company, Niles, Ill., a corporation of Illinois
Filed Mar. 24, 1965, Ser. No. 442,335
17 Claims. (Cl. 271—64)

This invention relates to printing and duplicating machines and pertains particularly to a mechanism or attachment for collating or sorting printed sheets delivered by a printing or duplicating machine.

In general, it is an object of the present invention to provide a new and improved mechanism or machine for sorting a series of sheets into a plurality of bins or receiving trays.

Another object is to provide such a new and improved mechanism which may readily be supplied as an attachment for a printing or duplicating machine.

A further object is to provide such a new and improved mechanism which may be adjusted to collate the sheets in the sense that the mechanism will direct successive sheets into successive bins.

Another object is to provide such a new and improved mechanism having a selectively adjustable counter for each bin so that the desired number of sheets may be directed into each successive bin.

It is another object to provide such a new and improved sorting device which may readily be adjusted so that all of the sheets will be directed into the first bin.

A further object is to provide a new and improved sorting device having means for automatically resetting the sorting device to its initial or starting position at the beginning of each new run.

Still another object is to provide a new and improved sorting device which is extremely dependable and trouble free.

Further objects and advantages of the present invention will appear from the following description, taken with the accompanying drawings, in which:

FIG. 1 is a general side elevational view of an illustrative embodiment of the invention in the form of a sorting or collating device mounted as an attachment on a duplicating or printing machine.

FIG. 2 is a fragmentary enlarged diagrammatic elevational view looking at the opposite side of the sorting device.

FIG. 3 is a general longitudinal sectional view taken through the sorting device.

FIG. 6 is a diagrammatic elevational view showing the drive for the sheet aimer of the sorting device.

FIG. 7 is an elevational view of the forwarding rollers on the sheet aimer, the view being taken generally as indicated by the line 7—7 in FIG. 6.

FIG. 8 is a fragmentary elevational view taken generally as indicated by the line 8—8 in FIG. 7.

FIG. 9 is a perspective view of one of the bins or receiving trays of the sorting device.

FIG. 10 is a fragmentary sectional view taken through the bins or receiving trays.

FIG. 11 is a fragmentary section taken generally along the broken line 11—11 in FIG. 10.

FIG. 12 is a fragmentary section taken generally along the line 12—12 in FIG. 9.

FIG. 13 is a perspective view of one of the retaining plates for the bins of the sorting device.

FIG. 20 is a section similar to FIG. 19 but showing the third counter stage in its resetting position.

FIG. 21 is a section, taken generally along the line 21—21 in FIG. 18 and showing the second counter stage in its initial position.

FIG. 22 is a section, taken generally along the line 22—22 in FIG. 18 and showing the first counter stage in its initial position.

FIG. 23 is a section showing particularly the resetting device for the counter, the view being taken generally along the line 23—23 in FIG. 18.

FIG. 24 is a section, taken generally along the line 24—24 in FIG. 18, and showing the non-retrograde ratchet of the counter.

FIG. 25 is an enlarged somewhat diagrammatic section, similar to a portion of FIG. 22, and showing the first stage of the counter in its initial position.

FIG. 26 is an enlarged elevational view of one of the transfer pawls of the counter.

FIG. 27 is a fragmentary somewhat diagrammatic plan view of the counter with various parts removed for clarity of illustration.

FIG. 28 is an end view of the main shaft of the counter showing particularly the manner in which the transfer cams are staggered on the shaft, various parts being removed from the shaft for clarity of illustration.

FIG. 29 is a schematic circuit diagram of the electrical control circuit for the sorting device.

Figure 4:
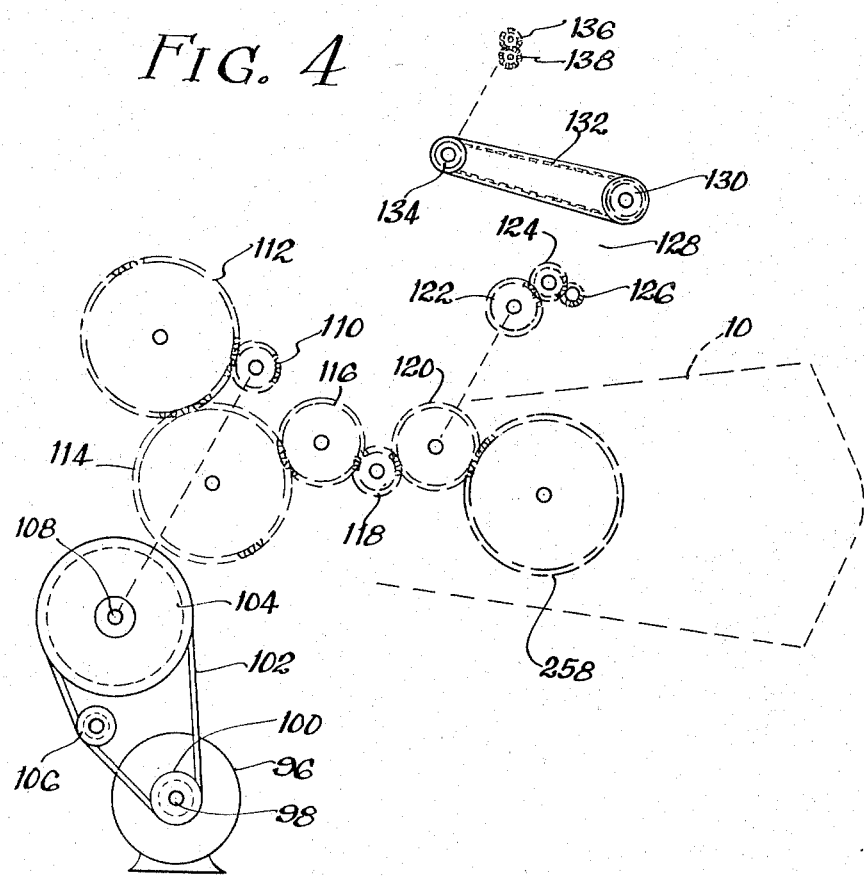
FIG. 4 is a diagrammatic view of the drive train for the sorting device.

The embodiment of the invention as illustrated in FIG. 1 comprises a collating or sorting device 10 which is mounted on a duplicating or printing machine 12. The illustrated duplicating machine 12 is in the form of a lithographic offset duplicator, but it will be understood that the sorting device 10 may be used in connection with any desired type of duplicating or printing machine.

As shown in FIG. 3, the duplicating machine 12 comprises upper and lower delivery rollers 14 and 16 which propel the printed sheets from the duplicating machine. The delivery rollers 14 and 16 are positioned so that the sheets are directed generally in a horizontal direction but downwardly at a small angle. In the absence of the sorting device 10, the delivery rollers 14 and 16 would deliver the printed sheets into an ordinary receiving tray or other similar device. The sorting device 10 is mounted on the duplicating machine 12 as an attachment, in place of the usual type of simple receiving tray.

The sorting device 10 comprises a frame 18 which is removably mounted on the duplicating machine 12. The frame 18 may comprise a pair of main side plates 20.

The sorting device 10 comprises a swingable aimer 22 which receives the sheets from the delivery rollers 14 and 16. The aimer 22 is swingably mounted on pivots 24 carried by the frame plates 20. The aimer 22 is swingable to a series of positions so as to direct the sheets into any of a series of receiving trays or bins 51-60 which are stacked vertically between the frame plates 20.

It will be noted that the illustrated sorting device employs ten bins or receiving trays, but it will be understood that any other suitable number of bins may be employed, as desired.

In the normal sequence of operation, the aimer 22 is initially in its uppermost position in which it directs the sheets into the uppermost bin 51. A control mechanism 62 is provided for automatically indexing the aimer 22 downwardly so as to direct sheets into the other bins 52–60. The control mechanism 62 may be programmed or adjusted so that any desired number of sheets will be directed into each of the successive bins 51–60. As will be described in greater detail shortly, the specific control mechanism 62 provides a range of adjustment whereby from one to five sheets may be directed into each of the first nine bins 51–59 before the aimer 22 is indexed to the next bin. The remaining sheets in the run are directed into the tenth and lowermost bin 60, which is somewhat deeper than the other bins to accommodate a large number of sheets. It will be understood that the control mechanism 62 may be varied so that a greater or lesser number of sheets may be directed into each bin.

In the present case, the control mechanism 62 may also be adjusted so that the aimer 22 will be retained in its initial position. With this adjustment, all of the sheets will be directed into the first or uppermost bin 51.

Various additional details of the duplicating machine 12 are shown in FIG. 3. In the illustrated machine, the paper sheets are printed as they pass between a blanket cylinder 64 and an impression cylinder 66. In the usual manner, the blanket cylinder 64 receives an offset image or impression from an inked lithographic master or plate on a master cylinder, not shown. After being printed, the sheets pass from the cylinders 64 and 66 to the delivery rollers 14 and 16 which propel them into the aimer 22 of the sorting device 10.

The illustrated aimer 22 comprises a swingable frame 68 which carries a chute 70 for directing the sheets between upper and lower forwarding rollers 72 and 74. The chute 70 comprises upper and lower guide plates 76 and 78 which are spaced widely apart adjacent the delivery rollers 14 and 16. The guide plates 76 and 78 converge or angle toward each other so that they are closely spaced adjacent the forwarding rollers 72 and 74. The lower guide plate 78 has a serpentine or S-shaped curvature so that the sheets travelling downwardly from the delivery rollers 14 and 16 will be deflected upwardly toward the rollers 72 and 74, particularly when the aimer 22 is in its initial position, as shown in full lines in FIG. 3. The final or lowermost position of the aimer 22 is also shown in FIG. 3, but in broken lines. In this position, the sheets coming from the delivery rollers 14 and 16 are deflected downwardly by the upper guide plate 76.

The arrangement of the upper and lower forwarding rollers 72 and 74 is shown in greater detail in FIG. 7. It will be seen that the upper forwarding roller 72 is in two parts or components 80 which are adjustably mounted near the opposite ends of a supporting shaft 82. The lower roller 74 has two pairs of parts or components 84 and 86, mounted on a supporting shaft 88. The rollers components 84 are adjustably mounted near the ends of the shaft 88 and are adapted to engage the upper roller components 80. The upper and lower roller components 80 and 84 are adjusted to engage the edge portions of the sheets so as to propel the sheets into the various bins 51–60. The roller components 80, 84 and 86 may be made of various materials, but it is preferred to make them of metal or some other low friction material, rather than rubber or some other high friction material. The delivery rollers 14 and 16 are normally made of rubber and do not permit any substantial slippage of the sheets. The metal rollers 80 and 84 do allow for some slight slippage of the sheets so as to avoid any tearing or wrinkling of the sheets due to the simultaneous propulsion of the sheets by the two sets of rollers, 14, 16, 72 and 74.

While the rollers 72 and 74 are driven at substantially the same surface speed as the rollers 14 and 16, the provision of the metal roller components 80 and 84 makes it unnecessary to maintain this equality of surface speed with a high degree of precision.

The components 86 of the lower roller 74 are mounted on the supporting shaft 88 on opposite sides of the central point along its length. A gap 90 is provided between the roller components 86. The upper forwarding roller 72 has three narrow rounded roller components 92, one of which is opposite the gap 90 between the roller components 86. The other narrow roller components 92 are opposite the gaps 94 between the roller components 84 and 86. The narrow roller components 92, in cooperation with the lower roller components 86, keep the sheets substantially flat between the interengaging roller components 80 and 84. The flatness of the sheets is maintained to insure that they will travel smoothly into the various bins 51–60.

The drive for the upper and lower forwarding rollers 72 and 74 is shown in FIGS. 4 and 6–8. The power for driving the rollers 72 and 74 is derived from the duplicating machine 12. For this reason, the pertinent portion of the drive for the duplicating machine is shown diagrammatically in FIG. 4. It will be seen that the duplicating machine 12 comprises an electric drive motor 96 having a shaft 98 which carries a drive pulley 100. A belt 102 is trained around the pulley 100 and also around a larger pulley 104 and a smaller belt tightening pulley 106. The pulley 104 is mounted on a shaft 108 which carries a pinion or small gear 110. In this case, the pinion 110 meshes with a large gear 112 which is carried by the blanket cylinder 64. The impression cylinder 66 carries another large gear 114 which meshes with the gear 112 on the blanket cylinder.

Another gear 116 meshes with the impression cylinder gear 114 and also with a small gear or pinion 118 carried by the lower delivery roller 16. It is from the gear or pinion 118 that the power for the sorting device 10 is derived. It will be seen that the sorting device carries a rotatable gear 120 which meshes with the pinion 118. A smaller gear 122 is connected to and rotatable with the gear 120. A still smaller gear 124 meshes with the gear 122 and also with a pinion 126 which is coaxial with the pivots 24 for the swing frame 68 of the aimer 22. The pinion 126 is mounted on a shaft 128 which also carries a toothed pulley or sprocket 130. A toothed belt 132 is trained around the pulley 130 and also around a toothed pulley 134 which is carried by the upper forwarding roller shaft 82. Meshing pinions 136 and 138 are provided on the upper and lower forwarding roller shafts 82 and 88 to drive the lower forwarding roller 74. It will be evident that the drive for the forwarding rollers 72 and 74 does not interfere with the swinging movement of the aimer 22. The ratio of the drive is such as to drive the forwarding rollers 72 and 74 at substantially the same surface speed as the delivery rollers 14 and 16.

Details of the arrangement of the bins 51–60 are shown in FIGS. 3 and 9–13. The bins 51–60 are mounted between the side plates 20 of the frame 18 for the sorting device 10. An upper frame plate 140 extends between the side plates 20. The frame 18 is supported on a bracket 142 which is connected to the frame 144 of the duplicating machine 12 by means of screws 146 or other fasteners. The bracket 142 includes an inclined supporting plate 148 along which the frame 20 is slidable. The frame 20 is provided with a pair of swingable latches 150 which interlock with slots 152 in the plate 148. When the latches 150 are released, the sorting unit 10 may be slid downwardly along the plate 148 to afford access to the delivery rollers 14 and 16 for cleaning and maintenance. If desired, the entire unit 10 may be removed from the machine.

The third bin or receiving tray 53 is shown in perspective in FIG. 9. The other bins are of similar construction, so that it will suffice to describe the details of the bin 53. It will be seen that the bin 53 comprises a flat bottom plate 154 which is reinforced with stiffening ribs 156. The bin 53 has a front wall in the form of a pair of upturned flanges 158. The bin is positioned in the frame 18 with the plate 154 slanting downwardly so that the sheets will slide downwardly against the front flanges 158. A notch 160 is formed in the front of the plate 154 to facilitate the removal of the sheets from the bin.

The bin 53 is formed with a rear wall in the form of a flange 162 which is generally V-shaped in cross section. The apex 164 of the V-shaped flange 162 projects rearwardly. Thus, the flange 162 has one leg 166 which slopes upwardly from the plate 154 to the apex of the flange. From the apex, the flange 162 has a second leg 168 which is inclined upwardly and forwardly.

It will be seen from FIG. 3 that the V-shaped flanges 162 form tapering chutes 170 which guide the sheets into the bins. Thus, the chute 170 for the bin 53 comprises the leg 168 on the bin 53, together with the leg 166 on the overlying bin 52.

The bin 53 has a pair of rearwardly disposed tabs 172 and a pair of forwardly disposed tabs 174 which project laterally from the plate 154. As shown in FIG. 3, the rearwardly disposed tabs 172 are retained in notches 176 which are formed in locating plates 178 mounted on the side plates 20. Similarly, the forwardly disposed tabs 174 are received in notches 180 formed in locating plates 182 on the sideplates 20. Retaining plates 184 are mounted on the side plates 20 to close the front ends of the notches 180 so as to retain the tabs 174 in the notches. The retaining plates 184 may be secured to the side plates 20 by means of screws 186 so that the retaining plates may easily be removed. All of the bins 51–60 may be removed from the frame 20 when the retaining plates 184 are removed.

It will be seen from FIGS. 3, 9 and 12 that a deflector or finger 188 projects downwardly and forwardly at an inclined angle from the bin 53. The finger 188 may be struck from the bottom plate 154. The finger 188 is effective to deflect the sheets downwardly into the underlying bin. Thus, the finger 188 prevents static electricity from interfering with the free sliding movement of the sheets in the bins. Some or all of the bins may be equipped with the fingers 188, as needed. A separate deflector 190 is mounted above the first bin 51.

Some or all of the bins may also be equipped with swingable cover plates 192. Each cover plate 192 rests upon the front flanges 158 and is swingably mounted on the overlying bin. The cover plate 192 may be swung upwardly to afford access to the bin. A notch 194 is preferably formed in the front edge of the cover plate 192 to facilitate the removal of the sheets from the bin.

Each of the illustrated cover plates 192 is loosely mounted for limited swinging movement on prongs or flanges 196 which project upwardly from downwardly inclined deflectors 198 struck from the plate 154. The prongs 196 are adapted to extend loosely through slots 200 in the cover plate 192. The plate may be formed with several sets of slots 200 to provide for adjustment of the position of the plate 192 on the corresponding bin. In addition to supporting the associated cover plate 192, the inclined deflectors 198 deflect sheets downwardly into the underlying bin. A pair of additional deflectors 202 may be provided between the deflectors 198.

The bins 52–59 may all be identical in construction. The uppermost bin 51 is similar to the bins 52–59 but is deeper so that it will hold a larger number of sheets. Thus, the uppermost bin 51 has front and rear flanges 158a and 162a which are higher than the flanges 158 and 162. The lowermost bin 60 is deeper than any of the other bins and thus is provided with higher front and rear flanges 158b and 162b. The deflectors 198 need not be provided on the lowermost bin 60.

A deflector plate 204 may be mounted beneath the frame plate 140 and over the uppermost bin 51. The plate 204 deflects the sheets downwardly into the uppermost bin 51.

In FIG. 3, the aimer 22 is shown in its initial position in which it directs the sheets into the uppermost bin 51. As the sheets are delivered by the duplicating machine 12 to the sorting device 10, the control mechanism 62 is normally effective to index the aimer 22 downwardly, step by step, so as to direct a predetermined number of sheets into each of the other bins 52–60.

As will be seen from FIG. 2, the illustrated control mechanism 62 has a main shaft 206 which is advanced, step by step, by the control mechanism. A link 208 is employed to connect the control mechanism 62 to the aimer 22. The link 208 is pivotally connected at one end of an arm 210 which is secured to the shaft 206. At its other end, the link 208 is pivotally connected to an arm 212 which is secured to the swingable arm 68 to the aimer 22.

The aimer 22 is based upwardly toward its initial position by a spring 214. In this case the spring 214 is stretched between the link 208 and an anchor 216 on one of the side plates 20. The spring 214 exerts a pull on the link 208, directed to the right, as shown in FIG. 2, and thereby tends to swing the aimer 22 upwardly.

As the aimer 22 is indexed downwardly, retrograde movement of the aimer is prevented by a ratchet mechanism 218 which comprises a ratchet segment 220 swingable with the frame 68 of the aimer 22. The ratchet segment 220 is engaged by a ratchet pawl 222 which is swingable about a pivot 224 mounted on the adjacent side frame 20. A spring 226 biases the pawl 222 against the ratchet 220. When the aimer 22 is to be returned to its initial position, the ratchet pawl may be disengaged from the ratchet 220, in a manner to be described presently.

Any possible overtravel of the aimer 22 is prevented by a brake mechanism 228 which imposes a small friction drag on the main shaft 206 of the control mechanism 62. The illustrated brake 228 comprises a pair of V-shaped shoes or clamps 230 and 232 which engage opposite side portions of a wheel or roller 234 on the shaft 206. A one-way clutch 235 is built into the wheel 234 so that it turns with the shaft 206 when it is advanced, but does not have to turn when the shaft is reversely rotated to its initial position. In this way, the brake 228 does not interfere with the return movement of the aimer 22. The one-way clutch 235 may be of the ratchet type as often employed in forwarding rollers. The shoe 230 is mounted on the rear end of an elongated arm 236 which is swingable about an anchor pivot 238. The other shoe 232 has an arm or extension 240 which is pressed against the arm 236 by a spring 242. It will be seen that the spring 242 is compressed by a screw 244 which extends through the arms 236 and 240. The screw 244 is fitted with a nut 246 which may be adjusted to regulate the force of the spring 242.

As shown in FIG. 24, the main shaft 206 of the control mechanism is provided with a ratchet mechanism 248 for preventing retrograde movement of the shaft 206 as it is advanced. The ratchet mechanism 248 comprises a ratchet segment 250 which is secured to the shaft 206. A ratchet pawl 252 normally engages the segment 250 and is engageable with a stop pin 256 to limit the return movement of the main shaft 206 when the control mechanism is returned to its initial position in the manner to be described presently.

Details of the drive for the control mechanism 62 are shown in FIGS. 14–17. The control mechanism 62 derives its operating power from the gear 120 which is also employed to drive the upper and lower forwarding rollers 72 and 74. A larger gear 258 meshes with the gear 120 and is rotatable about a pivot or shaft 260 which is secured to the frame plate 20. The gear 258 drives the control mechanism 62 through a control clutch 262 whereby the operation of the control mechanism may be started and stopped in a selective manner. The operation of the clutch 262 is controlled by a solenoid 264, although some other control device might be employed.

Figure 15:
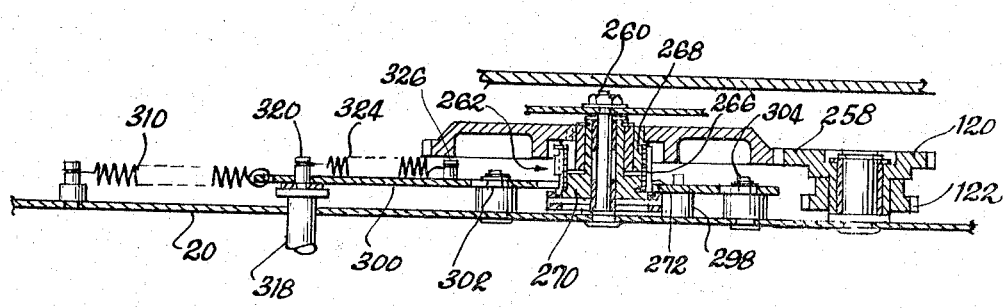
FIG. 15 is a fragmentary section taken along the broken line 15—15 in FIG. 14.

The illustrated clutch 262 comprises a coiled spring 266, as shown to best advantage in FIG. 15. The spring 266 is normally wrapped tightly around a hub 268 secured to the gear 258, and also around another hub 270 adjacent the hub 268. The hub 270 is also rotatably mounted on the pivot 260. One end of the spring 266 is connected to the hub 270 which is to be driven. The other end of the spring is connected to a control collar or sleeve 272 which is received around the spring 266. When the control collar 272 is allowed to rotate, the spring 266 forms a secure driving connection between the hubs 268 and 270. When the control collar 272 is held stationary, the rotation of the hub 268 on the gear 258 unwraps the spring sufficiently to disconnect the driving connection between the hubs 268 and 270, so that the gear 258 may continue to rotate, while the hub 270 is stationary.

In this case, the control collar 272 is formed with a single stop tooth or shoulder 274 which is engageable with a pawl or shoulder 276 on a lever 278, swingable about a pivot 280. A spring 282 is connected to the lever 278 so as to bias it in a clockwise direction. In this way, the pawl 276 tends to move into the path of the tooth 274.

Figure 14:
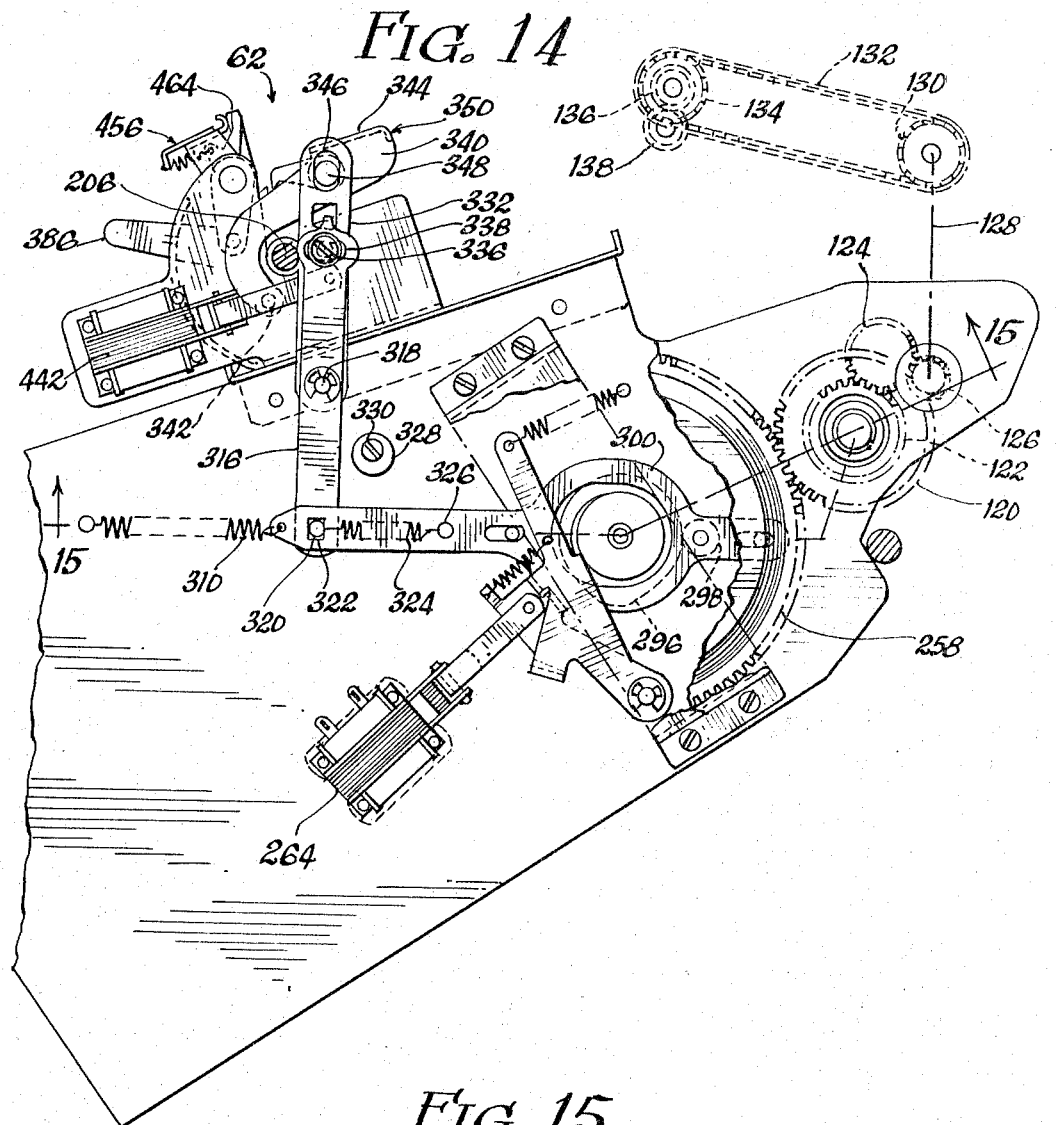
FIG. 14 is a fragmentary elevational view showing the clutch for operating the counter mechanism of the sorting device.
Figure 16:
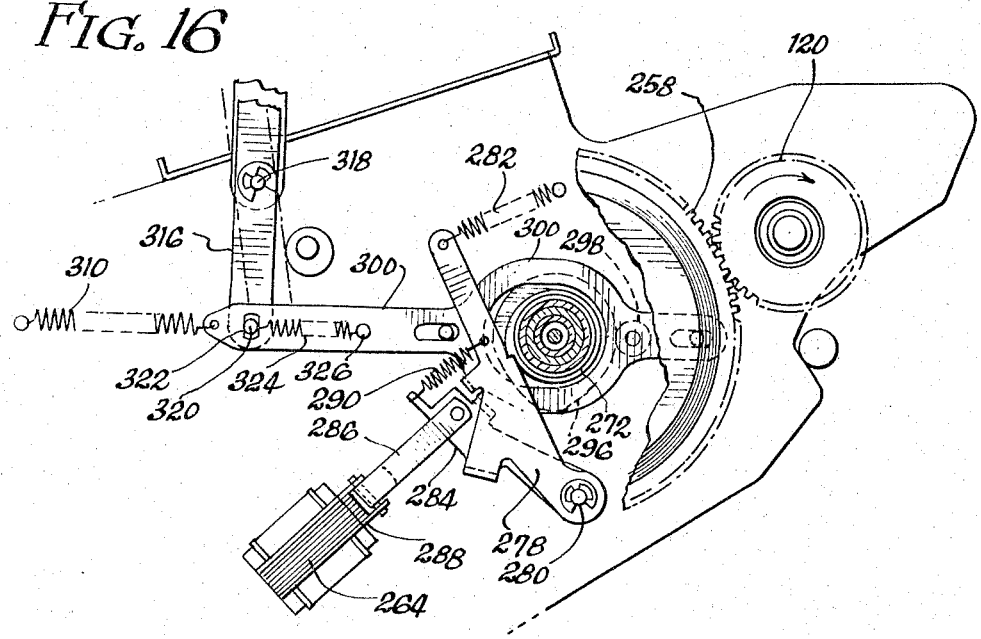
FIG. 16 is a fragmentary view similar to FIG. 14 but showing portions of the clutch in section.
Figure 17:
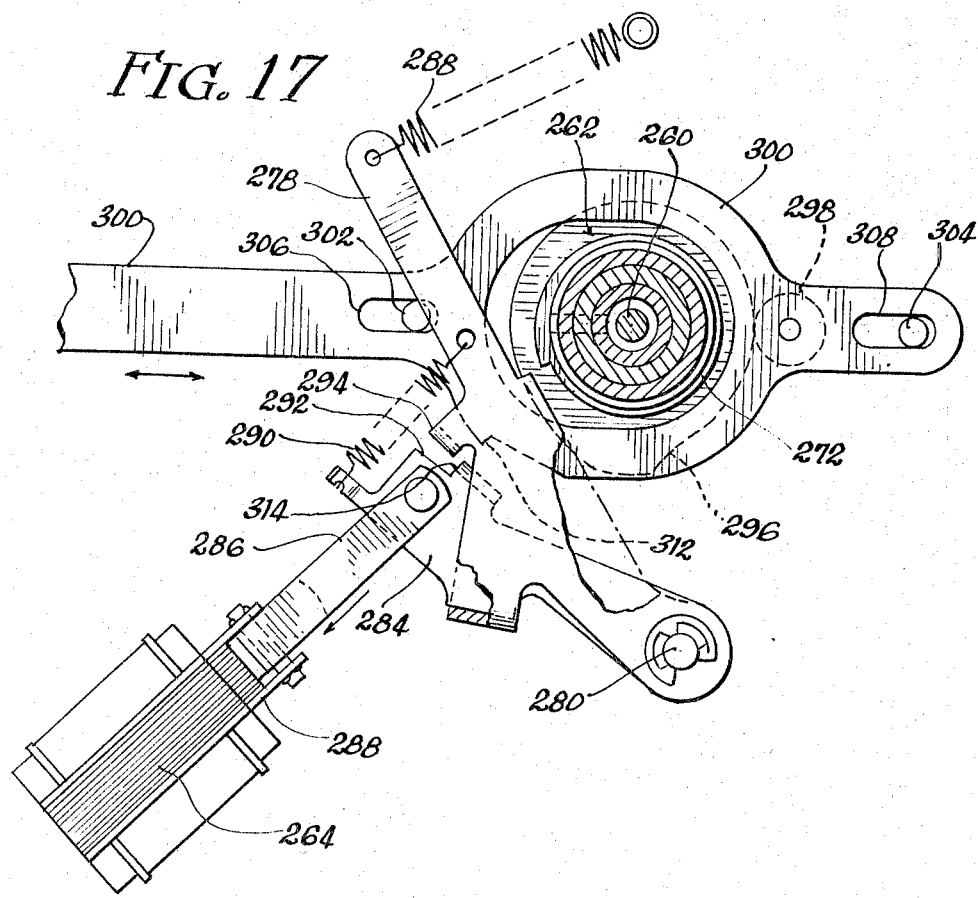
FIG. 17 is a fragmentary enlarged sectional view showing the clutch in a changed position.

The solenoid 264 is adapted to swing the lever 278 in a counterclockwise direction so as to disengage the pawl 276 from the tooth 274. In FIGS. 14 and 16, the pawl 276 is engaged with the tooth 274 so that the control collar 272 is held stationary. FIG. 17 shows the lever 278 in its displaced position, with the pawl 276 out of engagement with the tooth 274.

Instead of being connected directly to the lever 278 the solenoid 264 is connected to another lever 284 which is also swingable about the pivot 280. A link 286 is connected between the lever 284 and the armature 288 of the solenoid 264. A coil spring 290 is stretched between the levers 278 and 284. In the initial position of the mechanism, as shown in FIG. 16, the spring 290 causes a stop shoulder 292 on the lever 284 to engage an ear or tab 294 on the lever 278.

When the solenoid 264 is energized, the armature 288 moves downwardly and causes the lever 284 to swing in a counterclockwise direction. The increased pull of the spring 290 causes the lever 278 to swing in a counterclockwise direction against the pull of the biasing spring 282. In this way, the pawl 276 is disengaged from the tooth 274 on the control collar 272. The hub 270 is then driven by the clutch spring 266 so that the hub rotates with the gear 258.

In this case, the hub 270 carries a cam 296 which engages a roller 298 on a follower 300. The rotation of the cam 296 causes the follower 300 to reciprocate. The follower 300 is guided for horizontal sliding movement by a pair of pins 302 and 304 which are secured to the side plate 20 and are slidably received in slots 306 and 308 formed in the follower 300. As shown in FIGS. 14 and 15, the follower 300 is biased to the left by a spring 310, so that the roller 298 will be pressed against the cam 296.

To establish the initial position of the follower 300, a shoulder or tooth 312 is also formed on the follower. The lever 284 carries a pawl or tab 314 which is movable into the path of the tooth 312.

When the solenoid 264 is energized, the pawl 314 is moved out of the path of the shoulder 312. When the solenoid 264 is de-energized, the pawl 314 stops the shoulder 312 so as to insure that the follower 300 will be accurately located in its initial position.

As shown in FIG. 14, the slidable follower 300 is adapted to oscillate a lever 316 which is swingable about a shaft 318. The lower end of the lever 316 carries a pin 320 which is received in a slot 322 formed in the left-hand portion of the follower 300. A spring 324 is connected between the pin 320 and another pin 326 on the follower 300, to take up the slack between the pin 320 and the slot 322.

An adjustable eccentric stop 328 is provided to limit the counterclockwise movement of the lever 316. The eccentric 328 is provided with a clamping screw 330.

An arm 332 is secured to the shaft 318 adjacent the lever 316. Another arm 334 is secured to the opposite end of the shaft 318, adjacent the opposite end of the control mechanism 62, as shown in FIG. 2. The upper end of the lever 316 is adjustably secured to the arm 332 by means of a clamping screw 336 which extends through a slot 338 in the lever 316 and is tapped into the arm 332. The clamping screw 336 makes it possible to adjust the position of the arm 332 relative to the lever 316.

The illustrated control mechanism 62 comprises a pair of arms 340 which are disposed at opposite ends of the control mechanism and are swingable about coaxial pivots 342. A bail or bar 344 extends between the arms 340 and is rigidly connected thereto.

Pin and slot connections are provided between the arms 340 and the arms 332 and 334, so that the bail 344 will be oscillated by the arms 332. As shown, each of the arms 332 and 334 is formed with a longitudinal slot 346 which slidably receives a pin 348 on the adjacent arm 340. The pivots 342 are located somewhat below the main shaft 206 of the control mechanism 62. Each of the arms 340 is curved to afford clearance between the arms and the main shaft 206. The arms 340 and the bail or bar 344 constitute a rigid yoke 350.

The control mechanism 62 comprises a plurality of counter stages which are operated successively by the swinging movement of the bail 344. The number of counter stages is one less than the number of bins. Accordingly, the illustrated control mechanism 62 has nine counter stages 351–359, as indicated in FIG. 27. The nine counter stages are effective to index the aimer 22 through nine successive steps as it moves from the first bin 51 to the tenth bin 60. The counter stages 351–359 are all of the same construction, except that the first counter stage 351 differs in minor details from the other counter stages.

Each of the counter stages comprises a ratchet sector 362 which is freely rotatable on the main shaft 206. A separate actuating or driving pawl 364 is provided for each ratchet sector 362. All of the driving pawls 364 are freely rotatable on a shaft or rod 366 which is carried by the arms 340. Thus, all of the pawls 364 are oscillated with the yoke 350.

Each of the driving pawls 364 is provided with a spring 368 which is connected between the pawl and the yoke 350 so as to bias the pawl toward the corresponding ratchet sector 362. However, in the initial condition of the control mechanism 62, each of the driving pawls 364, except the pawl for the first counter stage 351, is held away from its ratchet 362 by an individual pawl releasing lever 370. All of the levers 370 are freely rotatable on a shaft or rod 372. Each lever 370 is formed with a laterally extending pin 374 which is engageable with a curved tail 376 on the corresponding pawl 364. When the pawl releasing lever 370 is swung forwardly, the pin 374 swings the corresponding pawl 364 out of engagement with the ratchet 362. The pawls 364 are shown in their lifted or disengaged positions in FIGS. 19–21.

Each of the ratchet sectors 362 is also provided with a non-retrograde or holding pawl 378. All of the holding pawls 378 are freely rotatable about a shaft 380. An individual spring 382 is connected to an arm 384 on each of the holding pawls 378 to bias the holding pawl toward the ratchet sector 362. In the initial condition of the control mechanism, all of the holding pawls 378 are in engagement with the corresponding ratchets 362.

Figure 18:
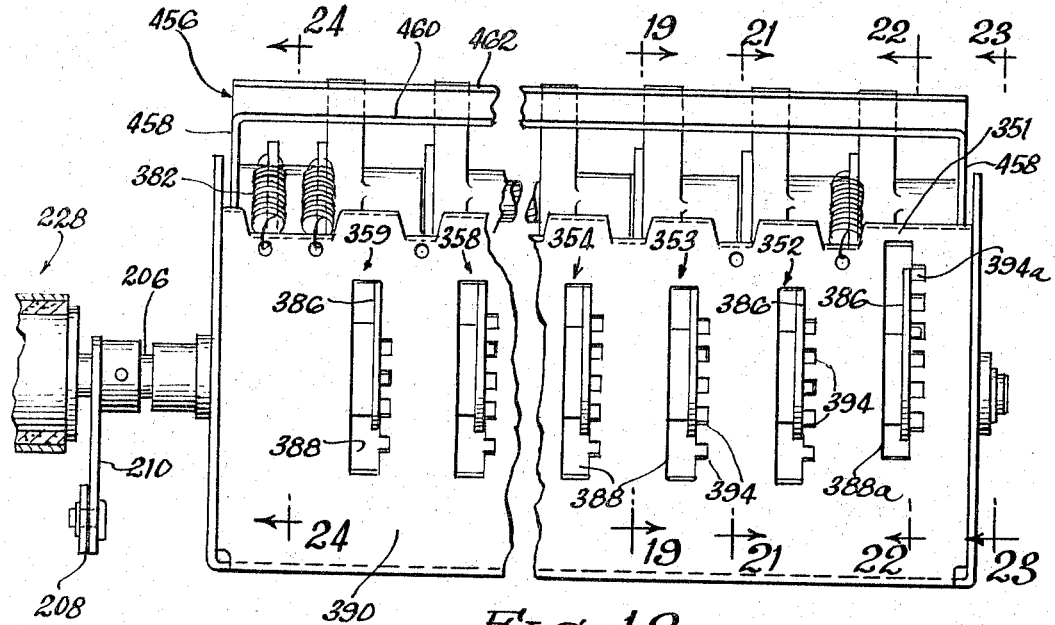
FIG. 18 is a fragmentary somewhat diagrammatic front elevational view of the programming control panel for the counter of the sorting device, certain parts being shown in section.

Each of the counter stages 351–359 is provided with a presetting lever 386 for setting the stage to the desired count. All of the presetting levers 386 are freely rotatable about the main shaft 206. Each lever 386 extends forwardly through a slot 388 in the curved front wall 390 of the housing 392 for the control mechanism 62. To detain the lever 386 in each of its adjusted positions, notches 394 are formed in the wall 390 along one edge of each slot 388. Each lever 386 is formed with an offset projection or detent 396 adapted to interlock with each of the notches 394. The lever 386 may be moved along the slot 388 by flexing the lever to the left, as seen in FIG. 18, so as to disengage the detent projection 396 from the notches 394. The number of notches 394 corresponds to the number of sheets to be counted into each bin. Thus, each of the slots 388 has five notches in the illustrated construction, except that the first slot has six notches. The uppermost notch 394a in the first slot provides an extra position in which the first counter stage 351 is shut off so that all of the sheets delivered by the duplicator are directed into the uppermost bin 51.

Each of the presetting levers 386 is formed with a laterally projecting tab or ear 398 which provides a return stop for the corresponding ratchet 362. Thus, the ratchet 362 has a radial edge or shoulder 400 which is engageable with the stop 398.

Each of the ratchets 362 is provided with an individual return spring 402 which in this case is mounted in an arcuate recess 404 formed in the ratchet sector. The spring 402 is of the coiled compression type and is confined in a curved position within the recess 404. One end of the spring 402 engages one end wall 406 of the recess 404. The other end of the spring 402 engages another laterally projecting tab or ear 408 which is struck from the presetting lever 386. The ear 408 projects into the recess 404.

When the ratchet 362 is released by the lifting of the driving and holding pawls 364 and 378, in a manner to be described presently, the spring 402 causes the ratchet 362 to return in a counterclockwise direction, as seen in FIG. 20, until it is stopped by the ear 398 on the presetting lever 386. The position to which the ratchet 362 is returned is determined by the position of the presetting lever 386.

The first counter stage 351 is shown in its initial position in FIGS. 22 and 25. When the clutch 262 is engaged by the energization of the solenoid 264, the yoke 350 is oscillated about its pivots 342. For each forward stroke of the yoke 350, the driving pawl 364 advances the ratchet 362 through a step corresponding to the spacing between the teeth of the ratchet. The holding pawl 378 prevents retrograde movement of the ratchet 362. After the desired count, the driving pawl 364 comes into engagement with a smooth portion 410 of the ratchet 362. As shown in FIGS. 22 and 25, the smooth portion is at the right-hand end of the ratchet and does not have any teeth. Thus, the driving pawl 364 is unable to advance the ratchet any farther. During the last step through which the first ratchet 362 is advanced, just before the ratchet pawl 364 runs out of teeth, the main shaft 206 is indexed through one step. To provide for such indexing of the main shaft 206, each ratchet sector 362 is provided with an indexing pawl or lever 412 having one indexing tooth 414. An individual arm 416 is secured to the main shaft 206 adjacent each of the ratchets 362 for engagement by the tooth 414 of the corresponding indexing pawl 412.

Each indexing pawl 412 is secured to the corresponding ratchet 362 by a pivot screw 418 so that the pawl 412 is swingable outwardly to provide clearance between the tooth 414 and the arm 416. During normal operation, the indexing pawl 412 is biased inwardly by a spring 420. When the counter mechanism is reset, the indexing pawls 412 are swung outwardly to clear the arms 416. The resetting operation will be explained in detail presently. At this point, it should be noted that each spring 420 is connected to a resetting lever 422 which, in turn, is connected to the corresponding indexing pawl 412. The lever 422 carries a pin 424 which is received in a curved slot 426, formed in the indexing pawl 412. The slot 426 makes it possible for the ratchet 362 to rotate without any interference from the resetting lever 422. Each lever 422 is freely mounted on the shaft 380, adjacent the associated holding pawl 378. The spring 420 biases the lever 422 inwardly. The pin 424, in turn, pushes the indexing pawl 412 inwardly.

When the driving pawl 364 advances the last tooth 430 of the ratchet 362, the tooth 414 on the indexing pawl 412 engages the arm 416 and advances the main shaft 206 through a step corresponding to the spacing between the ratchet teeth. As previously indicated, the non-retrograde ratchet and pawl 250 and 252 prevent retrograde movement of the main shaft 206 after it has been advanced. The pawl 252 is similar to the holding pawls 378 and is mounted on the same supporting shaft 380. The non-retrograde ratchet 250 is secured to the main shaft 206.

As already indicated, the first driving pawl 364 is the only one which engages its ratchet 362 in the initial condition of the control mechanism. All of the other driving pawls 364 are held in lifted positions, away from their ratchets 362 by the pawl releasing levers 370. When the main shaft 206 is indexed through its first step, the driving pawl 364 for the second counter stage 352 is released so that it engages its ratchet 362. To bring this about, an individual transfer cam 432 is secured to the main shaft 206 adjacent each of the pawl releasing levers 370. The initial position of the cam 432 for the second counter stage is shown in FIG. 21. It will be seen that the transfer cam 432 comprises a cylindrically curved flange on a member 434 which is secured to the shaft 206 and is formed integrally with one of the indexing arms 416. Each releasing lever 370 has a laterally projecting pin 436 which is engageable with the corresponding transfer cam 432. In the initial condition of the second counter stage, as shown in FIG. 21, the pin 436 is retained within the cam 432, so that the releasing lever 370 is retained in a position in which the pin 374 holds the pawl 364 in a lifted position. When the main shaft 206 is indexed through one step in a clockwise direction, the cam 432 moves away from the pin 436, whereupon the lever 370 is free to move counterclockwise. The biasing spring 368 thereupon causes the pawl 364 to move clockwise against the ratchet 362. The tail 376 of the pawl 364 pushes the pin 374 rearwardly and thereby causes the releasing lever 370 to swing counterclockwise.

The driving pawl 364 for the second counter stage then advances the second ratchet 362 until it runs out of teeth. On the last step of the second ratchet 362, the indexing pawl 412 of the second ratchet engages the corresponding arm 416 and indexes the main shaft 206 through another step. The transfer cams 432 for the successive counter stages are staggered around the main shaft 206, as clearly shown in FIG. 28, so that the cams release the levers 370 in sequence as the main shaft 206 is indexed step by step. Thus, the driving pawls 364 of the successive counter stages are dropped in sequence against their ratchets 362 as the main shaft 206 is indexed. Accordingly, the counter stages come into action successively as the main shaft 206 is advanced.

The indexing arms 416 are also staggered around the main shaft 206, as shown in FIG. 28. In this way, the indexing movement of the main shaft 206 which activates each counter stage also brings the corresponding arm 416 into the proper position for engagement by the tooth 414 of the corresponding indexing pawl 412 when the ratchet of the stage is advanced to its final position.

It has already been indicated that the presetting lever 386 of the first counter stage has an extra position in which the projection 396 on the lever engages the notch 394a. In this position, the lever 386 is moved clockwise as far as it will go to the position shown in broken lines in FIG. 22. In this position, a tab or ear 438 on the lever 386 engages a pin 440 on the first releasing lever 370 and swings the lever 370 counterclockwise, as shown in broken lines in FIG. 22. Such movement of the lever 370 moves the pin 374 against the tail 376 so as to lift the first driving pawl 364 from its ratchet 362. Accordingly, the first counter stage is shut off or rendered inoperative. In this condition, all of the paper sheets will be directed into the uppermost bin 51.

As already indicated, the effect of changing the positions of the presetting levers 386 is to change the initial positions of the ratchets 362. This has the effect of changing the count. When each presetting lever 386 is set for a full count of five, the ratchet 362 is positioned initially so that the driving pawl 364 will engage five successive teeth on the ratchet before it runs out of teeth. For the counter stages 352–359, the full count of five is achieved when the presetting lever 386 is in its uppermost position. When the lever 386 is moved to its lowermost position, the initial position of the ratchet 362 is advanced so that only one ratchet tooth is left for engagement by the driving pawl 364 before it runs out of teeth. In this condition, the counter stage is set for a minimum count of one.

In the case of the first counter stage 351, it is necessary to set the stage for a count which is one greater than the number of sheets which are to be fed into the uppermost bin 51, because of the time interval which is required for the first sheet to travel from the duplicating machine to the first bin. During the first advancing movement of the first ratchet, no sheet is actually fed into the first bin, because the first sheet has not yet arrived at the first bin. The first sheet is fed into the first bin during the second advancing movement of the first ratchet. Thus, the first ratchet must be advanced through six steps to obtain an actual count of five. For this reason, the slot 388a for the first lever 386 is staggered upwardly relative to the other slots 388. Thus, for any particular setting, the first lever 386 is positioned one step higher than the other presetting levers.

The control mechanism 62 is arranged so that all of the counter stages 351–359 may be reset to their original positions at any time, as desired by the operator. At the same time, the aimer 22 is returned to its initial position, as shown in FIG. 3, in which it delivers the sheets to the uppermost bin 51. While the resetting can be accomplished manually, the present control mechanism 62 is provided with power means in the form of a solenoid 442 to carry out the resetting operation. When the solenoid 442 is energized, all of the driving and holding pawls 364 and 378 are lifted from the ratchets 362. Moreover, the non-retrograde pawls 222 and 252 are lifted from the ratchets 220 and 250. In addition, all of the indexing pawls 412 are swung outwardly to afford clearance for the arms 416. The individual springs 402 return the counter ratchets 362 to their various initial positions as determined by the positions of the pre-selecting levers 386. The aimer 22 is returned to its uppermost position by the spring 214, as already described.

To lift the driving pawls 364 the control mechanism 62 is provided with a yoke or lever 444 comprising a pair of parallel arms 446 which are swingable about the same shaft 372 which supports the pawl releasing levers 370. The yoke 444 also comprises a bar 448 which extends between the arms 446. The upper edge of the bar 448 is formed into a curved flange 450 which is engageable with all of the pawl releasing levers 370.

It will be seen from FIG. 23 that a link 452 is connected between the yoke 444 and the armature 454 of the solenoid 442. When the solenoid 442 is energized, the yoke 444 is swung counterclockwise so as to move all of the pawl releasing levers 370 forwardly. The pins 374 on the levers 370 engage the tails 376 of the pawls 364 and swing the pawls clockwise so as to lift them from the ratchets 362.

To lift the holding pawls 252 and 378 and the indexing pawls 412, the control mechanism 62 is provided with another yoke 456 which comprises a pair of arms 458 swingable about the shaft 380 which supports the holding pawls. The outer ends of the arms 458 are connected together by a bar 460. A flanged plate 462 is adjustably mounted on the bar 460 and is engageable with tails 464 on the holding pawls 252 and 378. In addition, the adjustable plate 462 is adapted to engage tails 465 on the resetting levers 422. It will be seen that the springs 420 are connected between the levers 422 and the yoke 456. In this way the springs 420 do not resist the resetting movement of the yoke 456. Thus, the solenoid 442 does not have to overcome the force of the springs 420.

An operating link 466 is connected between the yoke 444 and an arm 468 which is connected to one of the arms 458 of the yoke 456. The link 466 is curved to clear the main shaft 206. When the solenoid 442 is energized, the movement of the yoke 444 is transmitted by the link 466 to the yoke 456, so that the yoke 456 is swung clockwise against the tails 464 of the holding pawls 252 and 378. In this way, the holding pawls are lifted from the ratchets 250 and 362. At the same time, the yoke 456 swings the resetting levers 422 outwardly. The pins 424 and slots 426 are effective to transmit this outward movement to the indexing pawls 412.

The control mechanism 62 is also arranged to lift the holding pawl 222 from the ratchet 220 when the solenoid 442 is energized. For this purpose, a link 470 is connected to the yoke 444 on the far side of the machine for the solenoid 152, as shown to best advantage in FIG. 2. The other end of the link 470 is connected to a lever 472 which is engageable with the pawl 222 and is adapted to lift the pawl 222 from the ratchet 220 when the link 470 is moved forwardly by the energization of the solenoid 442. The lifting of the pawl 222 releases the aimer 22 for upward return movement to its original position by the return spring 214.

It will be recalled that the control mechanism 62 is set into operation by the energization of the clutch solenoid 264. An automatic control arrangement is preferably provided for energizing the solenoid 264 whenever paper sheets are being delivered by the duplicator 12 to the sorting or collating device 10. Thus, for example, paper feelers may be employed to energize the solenoid 264 whenever paper is being fed through the duplicator 12. However, like most duplicators, the duplicator 12 is already equipped with paper feelers, to control an automatic counter 480 and to control the separation of the blanket and impression cylinders 64 and 66. As in the case of most duplicators, the cylinders 64 and 66 are separated when no paper is being fed and are brought together when paper is being fed. Thus, as shown in FIG. 1, the clutch solenoid 264 is preferably controlled by a sensitive switch 482 which is operated by a lever 484 already present on the duplicating machine 12. The lever 484 is connected to the paper feelers, not shown, so as to be swung upwardly or clockwise when paper is being fed. The particular lever 484 is a latching lever, adapted to latch an oscillating lever 486 which controls the separation of the blanket and impression cylinders 64 and 66. The lever 484 also controls the operation of the counter 480.

When the lever 484 is down, the switch 482 is operated to its OPEN position. When the lever 484 is up, the switch 482 moves to its CLOSED position so as to energize the clutch solenoid 264.

A manually operable switch 488 (FIG. 3) is provided for energizing the resetting solenoid 442. As shown, the switch 488 is mounted on the upper portion of the frame 18. Preferably, the switch 488 has three positions, including a central OFF position, a RESETTING position on one side of the OFF position and an OPERATING position on the other side of the OFF position. When the switch 488 is moved to its RESETTING position, the resetting solenoid 442 is energized. In the OPERATING position, power is supplied to the switch 482 so that the clutch solenoid 264 may be energized.

Figure 5:
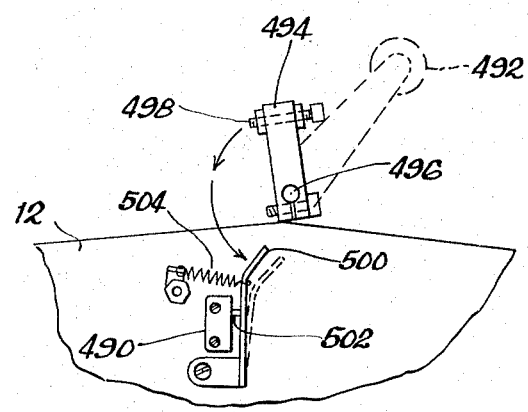
FIG. 5 is a diagrammatic elevational view showing a control mechanism for automatically resetting the sorting device at the beginning of each run.

As shown in FIG. 5, another switch 490 is preferably provided for automatically energizing the resetting solenoid 442 at the beginning of each printing cycle of the duplicator 12. The switch 490 is closed by the operation of an etch applicator lever 492 on the duplicator 12. The lever 492 operates the mechanism which applies an etch liquid to the lithographic master or plate on the master cylinder of the duplicator 12. It is the normal practice to operate the etch applicator at the beginning of each printing run. The etch applicator is operated by swinging the lever 492 counterclockwise, as shown in FIG. 5. When the lever 492 is released, it is spring returned to its original position.

To operate the switch 490, an arm 494 is secured to the shaft 496 which supports the lever 492. The arm 494 carries an adjusting screw 498 which engages a lever 500 when the lever 492 is swung counterclockwise. The spring biased operating plunger 502 of the switch 490 engages the lever 500. A spring 504 is connected to the lever 500 and is strong enough to operate the plunger 502. Thus, the switch 490 is initially operated to its OPEN position. When the etch applicator lever 492 is operated, the lever 500 is moved away from the plunger 502 so that the switch 490 is operated to its CLOSED position. The closing of the switch 490 energizes the resetting solenoid 442 so as to reset the control mechanism 62 and return the aimer 22 to its initial position.

FIG. 29 is a diagrammatic illustration of the electrical circuits for the switches and solenoids. The electrical power for operating the solenoids is derived from a pair of electrical supply lines 506 and 508. One side of each solenoid 264 and 442 is connected to one of the supply lines 508. The other side of the clutch solenoid 264 is connected to the supply line 506 through the switches 482 and 488. The switches 490 and 488 provide alternative energizing circuits for the resetting solenoid 442. Thus, the automatic resetting switch 490 is connected directly between the supply line 506 and the resetting solenoid 442. The manually operable switch 488 has a contactor 493 which is movable between contacts 495 and 497. The contactor 493 also has an OFF position in which it is out of engagement with both contacts 495 and 497. The manually operable switch 488 may be omitted, in which case the switch 482 is connected directly to the supply line 506.

It will be seen that the clutch control switch 482 is connected between the contact 495 and the clutch solenoid 264. The contactor 493 is connected to the supply line 506. The resetting solenoid 442 is connected directly to the contact 497.

It may be helpful to conclude with a brief summary of the operation of the collating or sorting device 10. Before each run, the sorting device 10 is reset by energizing the resetting solenoid 442. This may be done by operating the manual control switch 488 (FIG. 29) to its resetting position, or by closing the switch 490 (FIG. 5). The switch 490 is closed automatically by the operation of the etch applicator lever 492. Such lever is normally operated at the beginning of each run so as to apply etching liquid to the lithographic plate on the duplicator 12.

For normal operation, the switch 488 (FIG. 29) is in its ON position, in which the contactor 493 engages the contact 495. When paper is being fed through the duplicator 12, the switch 482 is closed by the upward movement of the paper feeler lever 484 (FIG. 1). The closure of the switch 482 energizes the clutch solenoid 262 (FIGS. 16 and 17).

When energized, the clutch solenoid 264 pulls the levers 278 and 284 away from the control collar 272 and follower 300. The tooth 274 on the control collar 272 is thus released, whereupon the control collar and the cam 296 are set into rotation by the clutch 262. The rotation of the cam 296 reciprocates the follower 300, which in turn oscillates the lever 316 so as to supply power to the control mechanism 62.

Before describing the operation of the control mechanism 62, it should be noted that the delivery rollers 14 and 16 of the duplicator 12 deliver the successive sheets to the chute 70 of the aimer 22. The converging plates 76 and 78 of the chute 70 guide the sheets between the rotating rollers 72 and 74 which propel the sheets into the first or uppermost bin 51.

In general, the control mechanism 62 is effective to index the aimer 22 downwardly, step by step, after the desired number of sheets have been delivered into each of the bins 51–60. In the present case, any number of sheets up to five may be delivered into each of the first nine bins 51–59 before the aimer 22 is indexed to the next bin. The remaining sheets in the run are delivered into the lowermost bin 60.

The oscillation of the lever 316, already referred to, causes oscillation of the yoke 350 which carries the driving pawls 364 for all of the counter stages. Initially only the pawl 364 for the first counter stage 351 is in engagement with its ratchet 362. All of the other driving pawls 364 are lifted by the corresponding levers 370. As the yoke 350 is oscillated, the first pawl 364 advances its ratchet 362 until the smooth portion 410 of the ratchet reaches the pawl. The number of ratchet teeth engaged by the driving pawl 364 depends upon the initial position of the ratchet 362, which in turn depends upon the initial position of the selector lever 386. The lever 386 carries the backstop 398 for the first ratchet 362 so as to establish the initial position thereof.

The holding pawl 378 prevents retrograde movement of the ratchet 362. When the driving pawl 364 engages and advances the last ratchet tooth, the main shaft 206 is indexed through one step by the engagement of the pawl tooth 414 with the corresponding arm 416 on the main shaft. The tooth 414 is on the pawl 412 which is pivotally mounted on the ratchet 362. The pivotal mounting of the pawl 412 facilitates the resetting of the ratchet and also makes it possible for the arm 416 to pass the tooth 414 in a forward direction. Such passing occurs in the second and subsequent counter stages.

The indexing of the main shaft 206 releases the driving pawl 364 for the second counter stage so that such pawl engages its ratchet 362. FIGS. 22 and 25 show the first counter stage in its initial condition. FIG. 21 shows the second counter stage in its initial condition, before the pawl 364 is released. The releasing of the second pawl 364 is brought about by the transfer cam 432 which is moved out of the way of the pin 436 on the releasing lever 370 when the main shaft 206 is indexed clockwise through one step by the first counter stage. When the lever 370 is released, the spring 368 causes the pawl 364 to move against the ratchet 362.

Figure 19:
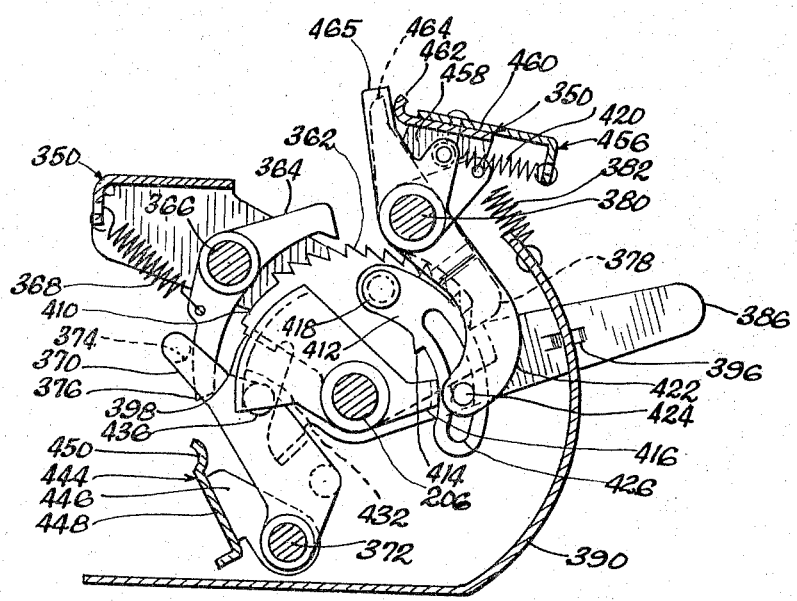
FIG. 19 is a section taken generally along the line 19—19 in FIG. 18 and showing the third counter stage in its initial position.

As in the case of the first counter stage, the second driving pawl 364 advances its ratchet 362 until the pawl runs out of ratchet teeth. When the pawl 364 advances the last ratchet tooth, the second indexing pawl 412 engages and advances the second arm 416, so that the main shaft 206 is indexed through another step. This releases the third driving pawl 364. FIG. 19 shows the third counter stage in its initial position. The main shaft 206 must be indexed two steps from this position before the third driving pawl 364 will be released.

The third and subsequent counter stages operate in the same manner as the first and second stages. In each case, the driving pawl 364 is released by the indexing movement of the main shaft 206 produced by the preceding stage. The driving pawl 364 advances its ratchet 362 until the smooth portion 410 of the ratchet comes opposite the driving pawl. When the driving pawl advances the last ratchet tooth, the indexing pawl 412 engages and advances the corresponding arm 416 on the main shaft 206.

The non-retrograde pawl 252 engages the ratchet 250 (FIG. 24) on the main shaft 206 and prevents retrograde movement of the main shaft. The advancing movement of the main shaft 206 is transferred to the aimer 22 by the link 208 (FIG. 2). Retrograde movement of the aimer is prevented by the engagement of the holding pawl 222 with the ratchet 220. The friction brake 228 prevents any possible overtravel of the aimer 22 when the main counter shaft 206 is advanced.

When the aimer 22 has been indexed to the lowermost bin 60, all of the driving pawls 364 of the control or counter mechanism 62 have run out of ratchet teeth, so that there is no further advancing movement of the main shaft 206. The remaining sheets in the run are delivered into the lowermost bin 60.

When the resetting solenoid 442 is energized, the yoke 444 is swung forwardly to reset all of the levers 372. The forward movement of the levers 370 lifts all of the driving pawls 364. The energization of the resetting solenoid 442 also swings the yoke 456 rearwardly so as to lift all of the holding pawls 252 and 378. The lifting of the holding pawls 378 releases the ratchets 362, whereupon they are returned against their backstops 398 by the individual springs 402. The position of each backstop 398 is determined by the position of the corresponding selector lever 386. The operation of the yoke 456 also swings the levers 422 and the indexing pawls 412 outwardly so that the pawls 412 are out of the way of the arms 416.

The lifting of the holding pawl 252 releases the main shaft 206 for return movement. The resetting solenoid 442 also operates the link 470 and thereby lifts the holding pawl 222 to release the ratchet 220. The spring 214 then returns the aimer 22 upwardly to its initial position. At the same time, the main counter shaft 206 is returned to its initial position.

It will be evident that the collating or sorting device of the present invention is extremely versatile and flexible. When simple collation is desired, the various counter stages may be set so that the aimer will deliver one sheet from each run into some or all of the first nine bins. When all of the printing runs have been completed, each of these bins will contain one set of the sheets.

For other sorting operations, the counter stages may be set to deliver two or more sheets of the first nine bins. For example, each bin may be employed to accumulate a group of sheets for routing to a particular recipient or department. After the sheets have been sorted into the first nine bins, the remaining sheets in each run are delivered into the lowermost bin.

The sorting device provides a high degree of automatic control. The sorting device is automatically reset at the beginning of each run by the operation of the etch applicator lever. The clutch for operating the counter mechanism is automatically engaged whenever sheets are being fed through the duplicator to the sorting device. When sheets are not being fed, the clutch is automatically disengaged.

The sorting device may readily be mounted as an attachment on either an existing duplicator or a new machine. It is easy to remove the sorting device for maintenance or cleaning of the machine.

Various other modifications, alternative constructions and equivalents may be employed without departing from the true spirit and scope of the invention, as exemplified in the foregoing description and defined in the following claims.

We claim:
1. In a device for sorting sheets received from a duplicating machine,
the combination comprising a series of spaced receiving trays,
a swingable aimer for receiving the sheets and directing them into the successive receiving trays,
said aimer having a pair of forwarding rollers mounted thereon and swingable therewith for propelling the sheets and a pair of guide plates converging toward said rollers for directing the sheets to the forwarding rollers,
a control mechanism for indexing said aimer to the successive trays,
said control mechanism having a series of counter stages for indexing the aimer through successive steps after a pre-selected number of sheets have been directed into each tray,
a power train for deriving power from the duplicating machine to operate said counter stages,
said power train including a selectively operable clutch,
and means for energizing said clutch in response to the feeding of sheets by said duplicating machine to said sorting device while de-energizing said clutch in response to the absence of fed sheets.

2. In a device for sorting sheets received from a printing machine,
the combination comprising a series of sheet receiving bins,
an aimer movable opposite each of said bins,
said aimer including means for receiving the sheets from the printing machine and directing the sheets to the bins,
a control mechanism including a series of counter stages for counting a pre-selected number of sheets into each bin and then indexing the aimer to the next bin,
each of said counter stages having manually operable means for preselecting the number of sheets,
power means for deriving power from said printing machine to actuate said counter stages,
and means for activating said power means in response to the feeding of sheets by said printing machine while deactivating said power means in response to the absence of fed sheets.

3. In a device for sorting paper sheets,
the combination comprising a series of sheet receiving bins,
an aimer swingable into position opposite each of said bins,
said aimer having a pair of forwarding rollers mounted thereon for swinging movement therewith for propelling the sheets into the adjacent bin,
and a pair of guides converging toward said rollers for directing the sheets to the forwarding rollers,
and means for indexing said aimer to the successive bins.

4. In a device for sorting sheets of paper or the like,
the combination comprising a series of spaced receiving trays,
an aimer movable opposite each of the trays for directing the sheets into the successive trays,
a pair of spaced frame plates for supporting the trays,
each of said trays having a pair of rear mounting tabs projecting laterally sidewise from the rear portion thereof and a pair of front mounting tabs projecting laterally sidewise from the front portion thereof,
a pair of rear locating members mounted on said frame plates and having notches therein for receiving and locating said rear mounting tabs,
a pair of front locating members mounted on said frame plates and having notches therein for receiving and locating said front mounting tabs,
and a pair of retaining members removably mounted on said frame plates for closing the notches in said front locating members and thereby retaining said front mounting tabs therein.

5. In a sorting device for sheets of paper or the like,
the combination comprising a series of spaced receiving trays,
and an aimer movable opposite the rear end of each of said trays for receiving the sheets and directing them into the successive trays, each of said trays including a flanged rear wall having a cross section in the form of a V with the apex of the V directed rearwardly toward said aimer, each of said rear walls having upper and lower flanges angling in divergent directions from said apex, the upper flange on each tray and the lower flange on the overlying tray forming a converging chute for guiding the sheets from the aimer into the tray.

6. In a device for sorting sheets of paper or the like, the combination comprising a series of spaced receiving trays, an aimer movable opposite each of said trays for directing the sheets into the successive trays, a frame for supporting said trays, each of said trays having a pair of rear mounting tabs projecting laterally sidewise from the rear portion thereof and a pair of front mounting tabs projecting laterally sidewise from the front portion thereof, a pair of rear locating members mounted on said frame and having notches therein for receiving and locating said rear mounting tabs, a pair of front locating members mounted on said frame and having notches therein for receiving and locating said front mounting tabs, and a pair of retaining members removably mounted on said frame for closing the notches in said front locating members and thereby retaining said front mounting tabs therein.

7. In a device for sorting sheets of paper or the like, the combination comprising a series of spaced receiving trays, an aimer movable opposite each of said trays for directing the sheets into the successive trays, a frame for supporting said trays, each of said trays having a pair of rear mounting tabs projecting laterally sidewise from the rear portion thereof and a pair of front mounting tabs projecting laterally sidewise from the front portion thereof, and a pair of rear locating members mounted on said frame and having notches therein for receiving and locating said rear mounting tabs, a pair of front locating members mounted on said frame and having notches therein for receiving and locating said front mounting tabs, and removable means on said frame for retaining said front mounting tabs in said notches in said front locating members.

8. In a sorting device for sheets of paper or the like, the combination comprising a series of spaced receiving trays, and an aimer movable opposite the rear end of each of said trays for receiving the sheets and directing them into the successive trays, each of said trays including a flanged rear portion having a cross section in the form of a V with the apex of the V directed rearwardly toward said aimer, said rear portions forming converging chutes for guiding the sheets from the aimer into said trays.

9. In a device for sorting paper sheets, the combination comprising a series of sheet receiving members, an aimer swingable into position opposite each of said members, said aimer having a pair of forwarding rollers mounted thereon and swingable therewith for propelling the sheets into the sheet receiving members, said aimer having guide means for directing the sheets to the forwarding rollers, and means for indexing said aimer to the successive sheet receiving members.

10. In an indexing mechanism, the combination comprising a main shaft adapted to be indexed through successive steps, biasing means for biasing said shaft toward its initial position, a plurality of counter stages mounted along said main shaft, each of said stages comprising a ratchet rotatable about said shaft, a driving pawl for advancing said ratchet, a spring biasing said ratchet toward its initial position, a holding pawl for preventing retrograde movement of said ratchet, an indexing pawl swingably mounted on said ratchet, a member secured to said shaft and positioned for engagement by said indexing pawl in response to predetermined advancing movement of said ratchet, a lever swingably mounted adjacent said ratchet and engaging said indexing pawl, and an additional spring connected to said lever and biasing said lever and said indexing pawl in a direction to urge said indexing pawl into the path of said member, and resetting means for lifting said driving and holding pawls from said ratchets while moving said levers in a direction to retract said indexing pawls from the paths of said members.

11. In an indexing mechanism, the combination comprising a shaft adapted to be indexed through successive steps, a plurality of counter stages mounted along said shaft, each of said stages comprising a ratchet rotatable about said shaft, a driving pawl for advancing said ratchet, a holding pawl for preventing retrograde movement of said ratchet, an indexing pawl swingably mounted on said ratchet, a member secured to said shaft and positioned for engagement by said indexing pawl in response to predetermined advancing movement of said ratchet, a lever swingably mounted adjacent said ratchet, means forming a pin and slot connection beween said lever and said indexing pawl, a spring connected to said lever and biasing said indexing pawl into the path of said member, and resetting means for moving said lever against said spring to move said indexing pawl out of the path of said member.

12. In an indexing mechanism, the combination comprising a shaft adapted to be indexed through successive steps, a plurality of counter stages mounted along said shaft, each of said stages comprising a ratchet rotatable about said shaft, a driving pawl for advancing said ratchet, a holding pawl for preventing retrograde movement of said ratchet, an indexing pawl swingably mounted on said ratchet, a member secured to said shaft and positioned for engagement by said indexing pawl in response to predetermined advancing movement of said ratchet, a lever swingable adjacent said ratchet, means forming a pin and slot connection between said lever and said indexing pawl, and a spring connected to said lever and biasing said indexing pawl into the path of said member, and resetting means for moving said driving and holding pawls away from said ratchets while moving said levers against said springs to move said indexing pawls out of the paths of said members.

13. In an indexing mechanism, the combination comprising a shaft adapted to be indexed through successive steps, a power lever mounted for oscillating movement adjacent said shaft, and a plurality of counter stages mounted along said shaft and operable by said power lever to index said shaft through successive steps, each of said stages comprising a ratchet rotatable about said shaft,
a driving pawl mounted on said power lever for advancing said ratchet,
a holding pawl for preventing retrograde movement of said ratchet,
a releasing cam secured to said shaft,
a releasing lever initially held by said cam against said driving pawl to hold said driving pawl away from said ratchet,
said releasing lever being released by said cam in response to indexing movement of said shaft,
an indexing pawl mounted on said ratchet,
and an indexing member secured to said shaft and positioned for engagement by said indexing pawl in response to predetermined advancing movement of said ratchet,
only said first releasing lever and said first driving pawl being released initially,
the successive releasing levers and driving pawls being released by said cams in response to successive steps in the indexing movement of said shaft.

14. In an indexing mechanism,
the combintion comprising a shaft adapted to be indexed through successive steps,
a power lever mounted adjacent said shaft for oscillating movement,
and a plurality of counter stages mounted along said shaft and operable by said power lever to index such shaft,
each of said stages comprising a ratchet rotatable about said shaft,
a driving pawl mounted on said power lever for advancing said ratchet,
a return spring biasing said ratchet toward its initial position,
a holding pawl for preventing retrograde movement of said ratchet,
a movable selector member having a stop thereon engageable by said ratchet to establish the initial position thereof,
an indexing pawl mounted on said ratchet,
an indexing member secured to said shaft and engageable by said pawl to index said shaft in response to predetermined advancing movement of said ratchet,
only the first driving pawl being initially engaged with the corresponding ratchet,
and means for successively releasing the other driving pawls into engagement with the corresponding ratchets in response to successive steps in the indexing movement of said shaft.

15. In an indexing mechanism,
the combination comprising a shaft adapted to be indexed through successive steps,
a power lever mounted adjacent said shaft for oscillating movement,
and a plurality of counter stages mounted along said shaft and operable by said power lever to index said shaft,
each of said stages comprising a ratchet rotatable about said shaft,
a driving pawl mounted on said power lever for advancing said ratchet,
a return spring biasing said ratchet toward its initial position,
a holding pawl for preventing retrograde movement of said ratchet,
a movable selector member having a stop thereon engageable by said ratchet to establish the initial position thereof,
an indexing pawl mounted on said ratchet,
an indexing member secured to said shaft and engageable by said indexing pawl to index said shaft in response to predetermined advancing movement of said ratchet,
only the first driving pawl being initially engaged with the corresponding ratchet,
means for successively releasing the other driving pawls into engagement with the corresponding ratchets in response to successive steps in the indexing movement of said shaft,
and releasing means for lifting all of said driving and holding pawls from said ratchets to release said ratchets for return movement to their initial positions by said springs.

16. In a device for sorting paper sheets,
the combination comprising a series of sheet receiving bins,
an aimer swingable into position opposite each of said bins,
said aimer having a pair of forwarding rollers for propelling the sheets into the bins,
a shaft connected to said aimer for indexing said aimer,
a power lever mounted for oscillating movement adjacent said shaft,
a drive for oscillating said power lever and including a selectively operable clutch,
means for engaging said clutch in response to the feeding of sheets to said aimer,
and a plurality of counter stages mounted along said shaft and operable by said power lever to index said shaft through successive steps,
each of said stages comprising a ratchet rotatable about said shaft,
a driving pawl mounted on said power lever for advancing said ratchet,
only the first driving pawl being initially engaged with the corresponding ratchet,
a holding pawl for preventing retrograde movement of said ratchet,
an indexing pawl mounted on said ratchet,
a member carried by said shaft and engageable by said indexing pawl for indexing said shaft in response to predetermined advancing movement of said ratchet,
and means for successively moving said driving pawls into engagement with the corresponding ratchets in response to successive steps in the indexing movement of said shaft.

17. In an indexing mechanism,
the combination comprising a shaft adapted to be indexed through successive steps,
a power lever mounted adjacent said shaft for oscillating movement,
a plurality of counter stages mounted around said shaft and operated by said power lever to index said shaft,
each of said stages comprising a ratchet rotatable about said shaft,
a driving pawl mounted on said power lever for advancing said ratchet,
a return spring biasing said ratchet toward its initial position,
a holding pawl for preventing retrograde movement of said ratchet,
a movable selector member having a stop thereon engageable by said ratchet to establish the initial position thereof,
an indexing pawl swingably mounted on said ratchet,
an indexing member secured to said shaft and engageable by said indexing pawl to index said shaft in response to predetermined advancing movement of said ratchet,
a lever swingable adjacent said ratchet,
means forming a pin and slot connection between said lever and said indexing pawl,
and a biasing spring connected to said lever and biasing said indexing pawl into the path of said indexing member,
only the first driving pawl being initially engaged with the corresponding ratchet, means for successively releasing the other driving pawls into engagement with the corresponding ratchets in response to successive steps in the indexing movement of said shaft, biasing means for returning the shaft to its initial position, another ratchet secured to said shaft, another holding pawl for engaging said other ratchet to prevent retrograde movement of said shaft, and resetting means for lifting all of said driving and holding pawls from said ratchets while also moving said levers to retract said indexing pawls out of the paths of said indexing members, whereby said ratchets and said shaft are released for free return movement to their initial positions.

References Cited by the Examiner
UNITED STATES PATENTS

| | | | |
|---|---|---|---|
| 2,076,391 | 4/1937 | Whitehead | 271—64 |
| 2,093,992 | 9/1937 | Braam | 271—64 |
| 2,241,168 | 5/1941 | Truitt et al. | 271—64 |
| 2,492,386 | 12/1949 | Little | 271—64 |
| 2,661,209 | 12/1953 | McGalliard | 271—64 |
| 2,919,917 | 1/1960 | Worswick | 271—64 |

EVON C. BLUNK, *Primary Examiner.*

A. C. HODGSON, *Assistant Examiner.*